(12) United States Patent
Massie et al.

(10) Patent No.: US 7,230,944 B1
(45) Date of Patent: Jun. 12, 2007

(54) SYSTEM AND METHOD OF HOST ROUTING WHEN HOST COMPUTER IS WITHIN A HOME NETWORK AND/OR A COMPLEMENTARY NETWORK

(75) Inventors: Rodney E. Massie, Lindenhurst, IL (US); Chantel M. Speaks, Menomonee Falls, WI (US)

(73) Assignee: Geologic Solutions, Inc., Herndon, VA (US)

( * ) Notice: Subject to any disclaimer, the term of this patent is extended or adjusted under 35 U.S.C. 154(b) by 961 days.

(21) Appl. No.: 10/440,367

(22) Filed: May 19, 2003

Related U.S. Application Data

(63) Continuation-in-part of application No. 09/958,752, filed as application No. PCT/US00/35513 on Dec. 29, 2000, now Pat. No. 6,947,737.

(60) Provisional application No. 60/173,742, filed on Dec. 30, 1999.

(51) Int. Cl.
 *H04L 12/28* (2006.01)
(52) U.S. Cl. .................. 370/351; 370/352; 370/400; 455/428
(58) Field of Classification Search ............. 370/352, 370/400, 351; 455/428, 395.53
See application file for complete search history.

(56) References Cited

U.S. PATENT DOCUMENTS

| 4,412,292 A | 10/1983 | Sedam et al. |
| 4,910,794 A | 3/1990 | Mahany |
| 4,924,462 A | 5/1990 | Sojka |
| 4,940,974 A | 7/1990 | Sojka |
| 5,442,568 A | 8/1995 | Ostendorf et al. |
| 5,457,680 A | 10/1995 | Kamm et al. |
| 5,475,597 A | 12/1995 | Buck |
| 5,559,520 A | 9/1996 | Barzegar et al. |
| 5,561,446 A | 10/1996 | Montlick |
| 5,603,081 A | 2/1997 | Raith et al. |
| 5,608,643 A | 3/1997 | Wichter et al. |
| 5,703,570 A | 12/1997 | Gorday et al. |
| 5,719,771 A | 2/1998 | Buck et al. |
| 5,772,599 A | 6/1998 | Nevo et al. |
| 5,787,357 A | 7/1998 | Salin |
| 5,819,172 A | 10/1998 | Campana, Jr. et al. |
| 5,822,216 A | 10/1998 | Satchell, Jr. et al. |
| 5,835,720 A | 11/1998 | Nelson et al. |
| 5,859,838 A | 1/1999 | Soliman |
| 5,878,036 A | 3/1999 | Spartz et al. |

(Continued)

FOREIGN PATENT DOCUMENTS

EP 0 809 383 11/1997

(Continued)

OTHER PUBLICATIONS

ARDIS Company. 1994. *ARDIS Network Connectivity Guide*.

(Continued)

*Primary Examiner*—CongVan Tran
(74) *Attorney, Agent, or Firm*—The Patent Source

(57) ABSTRACT

A system and method of wireless communication enabling a device to transmit data via a second routing switch to a host computer associated with at least first and second routing switches, subsequent to determining that the host computer cannot receive the data from the first routing switch.

42 Claims, 14 Drawing Sheets

U.S. PATENT DOCUMENTS

| | | | |
|---|---|---|---|
| 5,884,202 | A | 3/1999 | Arjomand |
| 5,940,751 | A | 8/1999 | Kaplan et al. |
| 5,940,771 | A | 8/1999 | Gollnick et al. |
| 5,941,363 | A | 8/1999 | Partyka et al. |
| 5,963,452 | A | 10/1999 | Etoh et al. |
| 5,974,236 | A | 10/1999 | Sherman |
| 5,974,300 | A | 10/1999 | LaPorta et al. |
| 5,978,679 | A | 11/1999 | Agre |
| 6,028,846 | A | 2/2000 | Cain |
| 6,056,194 | A | 5/2000 | Kolls |
| 6,078,891 | A | 6/2000 | Riordan et al. |
| 6,097,947 | A | 8/2000 | Takai |
| 6,097,962 | A | 8/2000 | Corriveau et al. |
| 6,104,712 | A | 8/2000 | Robert et al. |
| 6,116,743 | A | 9/2000 | Hoek |
| 6,128,320 | A | 10/2000 | Watanabe et al. |
| 6,134,671 | A | 10/2000 | Commerford et al. |
| 6,137,791 | A | 10/2000 | Frid et al. |
| 6,138,022 | A | 10/2000 | Strawczynski et al. |
| 6,178,337 | B1 | 1/2001 | Spartz et al. |
| 6,185,619 | B1 | 2/2001 | Joffe et al. |
| 6,335,926 | B1 * | 1/2002 | Silton et al. ............... 370/351 |
| 6,745,246 | B1 * | 6/2004 | Erimli et al. ............... 709/238 |
| 6,757,497 | B2 * | 6/2004 | Chang et al. ............... 398/51 |
| 6,819,666 | B2 * | 11/2004 | Chang et al. ............... 370/352 |
| 2002/0090938 | A1 * | 7/2002 | Dharia et al. ............... 455/422 |
| 2003/0235155 | A1 * | 12/2003 | Boivie et al. ............... 370/238 |
| 2004/0153572 | A1 * | 8/2004 | Walker et al. ............... 709/239 |
| 2006/0039351 | A1 * | 2/2006 | Furuhashi et al. ........... 370/351 |
| 2007/0047557 | A1 * | 3/2007 | Martini et al. ............ 370/395.53 |

FOREIGN PATENT DOCUMENTS

| | | |
|---|---|---|
| EP | 0 967 775 | 12/1999 |
| WO | WO 97/47144 | 12/1997 |

OTHER PUBLICATIONS

Motorola. 1995. *DataTAC Open Protocol Specifications: Standard Context Routing Release 1.0*. (Doc. No. 68P0425C20-A). Richmond, British Columbia: Motorola, Inc.

Motorola. 1995. *DataTAC Open Protocol Specifications: User's Guide*. (Doc. No. 68P04025C25-A). Richmond, British Columbia: Motorola, Inc.

ARDIS Company. 1997. *ARDIS DataTac 4000: Software Developers Reference Guide*. Revision 2.0.

Motorola. 1997. *DataTac Wireless Data Networks: Applications Development Guide* (Doc. No. 6804111L20-A). Richmond, Virginia: Motorola, Inc.

Apr. 5, 2001. International Search Report from PCT Application No. PCT/US00/35513.

Nov. 8, 2001. Written Opinion from PCT Application No. PCT/US00/35513.

Dec. 1993. "Software Product Description: RoamAbout Transport Version 2.0 for MS-DOS and MS-Windows." *digital.*

Motorola. Sep. 1995. *Wireless Data Communications: The Choices*. Bothell, Washington: Motorola, Inc.

Motorola. Nov. 1995. *DataTAC Open Protocol Specifications: DataTAC Messaging Release 1.0*. (Doc. No. 68P04025C10-A). Richmond, British Columbia: Motorola Inc.

Stilwell, Markus. Nov. 16, 1995. *What is Data Mining?* www.cs.usask.ca/homepages/grads/mgs310/Cmpt826S3/node5.html.

Motorola. Jan. 1996. *DataTAC Networks: Introduction for Application Developers*. (Doc. No. 6804111L12-O). Bothell, Washington: Motorola, Inc.

Noble, B., G. Nguyen, M. Satyanarayanan and R. Katz. Oct. 1996. "Mobile Network Tracing." *Internet RFC/STD/FYI/BCP Archives*. Doc. No. RFC2041.

ARDIS Company. Jan. 1997. *ARDIS DataTac 4000: Software Developers Reference Guide*. Revision 2.0.

Moss, Julian. Sep. 1997. "Understanding TCP/IP." *PC Network Advisor*, Issue 87, pp. 3-6.

Motorola. Nov. 1997. *DataTAC Wireless Data Networks: Application Development Guide*. (Doc. No. 6804111L20-A). Bothell, Washington: Motorola IPSG.

Motorola. 1997. "Multiple Agencies Share New System in Peel Region." *Exchange Online*. www.motorola.com/LMPS/RNSG/exchange/spr97/index.html.

Fabris, Peter. May 15, 1998. "Advanced Navigation." *CIO Magazine*.

Kessler, Gary C. Apr. 23, 1999. "An Overview of TCP/IP Protocols and the Internet." Hill Associates; Inc.

Jul. 19, 1999. "American Mobile to Deliver Wireless Telemetry Applications Through Partnerships with CA and cStar Technologies; ARDIS Network to be Utilized for Monitoring Remote Devices; Vending Machines, Utility Meters, Traffic Lights and ATMs Targeted." *In The News*. 1999 Press Releases. Motient Corporation. www.motient.com/Content/IntheNews/PressReleases/1999PressReleases/99-20.html.

Greiner, Lynn. Aug. 27, 1999. "Online Management Becomes the Real Thing." *Computer Dealer News*. www.cstartech.com/real_thing1.html.

Nov. 7, 1999. "How ARP Works & Why Duplicate Addresses Shouldn't Be Used." *Microsoft Product Support Services*. wysiwgy://85/http://support.Microsoft.com/support/kb/articles/Q93/5/58.A.

Computer Associates. 1999. "Unicenter TNG: Total Enterprise Management." Islandia, New York: Computer Associates International Inc.

Salkintzis, Apostolis K. 1999. "A Survey of Mobile Data Networks." *IEEE Communications Surveys*. Third Quarter 1999, vol. 2, No. 3.

1999. "Overview of IPM." Cisco Systems Inc. http://www.cisco.com/univercd/cc/td/doc/p...rtrmgmt/ipmcw2k/ipm20/ipmug20/ipmover.html.

Motorola. Mar. 2000. *DataTAC 5000 System Release 6.1: Application Programmer's Guide* (Doc. No. 68P04053C04 REV1). Richmond, British Columbia: Motorola, Inc.

Fonseca, Brian. Apr. 11, 2000. "Computer Associates touts its Unicenter platform for device management." *Infoworld.com*. www.infoworld.com/cgi-bin/deletefr...cles/en/xml/00/4/000411encamobile.xn.

Apr. 11, 2000. "Computer Associates and American Mobile Satellite Corp. Extend Wireless Enterprise Applications for eBusiness: Mobile eBusiness Applications Take Off with ARDIS Wireless Data Network Seamlessly Integrated With CA's Unicenter TNG." *Press Room*. wysiwyg://235/http://www.ca.com/press/2000/04/tng_americanmobile.html.

Apr. 11, 2000 "Computer Associates and Motient Extend Wireless Enterprise Applications for eBusiness." *AboutMotient*. www.motient.com/content/aboutmotient/businesspartners/ca.html.

Apr. 11, 2000. "Computer Associates Dispenses New Revenue Opportunities for the Vending Machine Industry With Unicenter TNG Optimal Vending Solution: CA and cStar Partner to Deliver Increased Customer Service Levels and Reduced Operational Costs With Remote eBusiness Management Application." *Press Room*. wysiwg://231/http://www.ca.com/press/2000/04/tng_vending.html.

Casselman, Grace. May 5, 2000. "Net Mania Abounds at CA World." *NetworkWorld*. www.itworldcanada.com/nw/archive/nw10-09/nw_Wtemplate.cfm?filename=n109n2.html.

Menezes, Joaquim. May 26, 2000. "Enterprise Computing." *Computing Canada, The Newspaper for Information Technology Management*, vol. 26, Issue 11. www.cstartech.com/enterprise2.html.

Hyppönen, Mikko. Sep. 2000. "WAP and Viruses—Can your Mobile Phone Get Infected?" *Virus Bulletin Conference*. Virus Bulletin Ltd, The Pentagon, Abingdon, Oxfordshire, England.

Sep. 2000. "Creating Internet Wave III by Connecting Non-IT World to IT World Via any Media [Wireless WAN, LAN, Landline & PLC (power Line Carrier)]." *CStar Technologies Inc*. www.startech.com/newpg.htm.

Sep. 2000. "DirectGate™, Features & Benefits." http://www.cstartech.com/ben.html.

Sep. 2000. "Enterprise Management Strategy: Managing the Extended Enterprise." *Unicenter TNG*. Computer Associates International, Inc. http://cai.com/products/unicent/whitepap.html.

Sep. 2000. "SNA." *ATM Protocol Directory*. http://www.protocols.com/pbook/sna.html.

Sep. 2000. "System Performance & Hardware Platform." http://www.cstartech.com/hard.html.

Sep. 2000. "Vending." *Rutherford & Associates*. www.ruthsx.com/products/vending.html.

Sep. 2000. "X.25." *ATM Protocol Directory*. http://www.protocols.com/pbook/x25.html.

Pentikousis, Kostas. 2000. "TCP In Wired-Cum-Wireless Environments." *IEEE Communications Surveys*. Fourth Quarter 2000, pp. 2-14.

Sewitt, Carol. 2000. "Solbyung (Stella) Yoon: Living Her Dream." *Rotman Management: The Alumni Magazine of the Rotman School of Management*. www.cstartech.com/rotmanm.html.

Fairhurst, Gorry. Jan. 1, 2001. "Address Resolution Protocol (arp)." www.erg.abdn.ac.uk/users/gorry/course/inet-pages/arp.htm.

Unger, Lorin. Feb. 14, 2001. "Blackberry 957." *Wap.com*. wysiwgy://165/http://www.wap.com/share/osas/cache/artid500407.html.

Gagnon, Louis-Philippe and Nick Ratelle. Feb. 28, 2001. "RIM: Pager gone PDA". Macadamian Technologies Inc. www.macadamian.com/column/rimdevelopment.htm.

Mar. 27, 2001. "Overview: Cisco Wireless Network Management Suite 1.0." http://www.cisco.com/univercd/cc/td/doc/product/rtrmgmt/wireless/nm_suite.html.

May 23, 2001. "ARP." *Enterprise Storage Strategies Conference & EXPO*. internet.com. wysiwyg://69/http://www.pcwebopedia.com/TERM/A/ARP.htm.

Kessler, Gary C. May 29, 2001. "An Overview of TCP/IP Protocols and the Internet."

Oct. 3, 2001. "TCP/IP and IPX routing Tutorial." *Sangoma Technologies*.

Hays, Constance L. Oct. 23, 2001. "For Retailers of Luxury Goods, Business Has Dried Up." CBSMarketWatch.com.

Flack, Marjorie. 2001. "The Story of the PING Program." http://ftp.arl.mil/~mike/ping.html.

Motorola. 2001. "Vanguard Applications Ware Serial Feature Protocols: TPDU Protocol." Mansfield, Massachusetts: Motorola, Inc. pp. 1-101.

2001. "Research In Motion: RIM 850 Wireless Handheld." *GoAmerica: Wire Data Solutions*. Wysiwyg://127/http://www.goamerica.net/showcase/rim850/index.htm.

2001. "Technical Information: Routing Requirements on the Motient Network." *PARTNERAREA*. www.motient.com/content/partnerarea...program/technicalinformation/technical.

2001. "Understanding ARP: A NetworkUptime.com Tutorial." *Network Tutorials*. www.networkuptime.com/tutorials/arp.

Jarosik, Michael. "The Wireless Battleground." *Business uplugged: [part3]*.

McMahan, Michael L., Ali Khatzibadeh and Pradeep Shah. "Wireless Systems and Technology Overview." Dallas, Texas: Texas Instruments.

Stalling, William. "Data and Computer Communications." *Electronic Mail—SMTP and Mime*. MacMillan, 5$^{th}$ edition, pp. 701-724.

"Ping." *Connected: An Internet Encyclopedia*. wysiwyg://75/hppt://www.freesoft.org/CIE/Topics/53.html.

"Unicenter TNG® Optimal Vending Solution." *Real World Management Solutions*.

* cited by examiner

HOST HOT BACKUP

HOST HOT BACKUP-COMP. NETWORK

HOST NODE REDUNDANCY
COMPLEMENTARY NETWORK

ROUND ROBIN

ROUND ROBIN - COMPNET

SYSTEM AND METHOD OF HOST ROUTING WHEN HOST COMPUTER IS WITHIN A HOME NETWORK AND/OR A COMPLEMENTARY NETWORK

RELATED APPLICATIONS

This application claims priority from and is a continuation-in-part of U.S. application Ser. No. 09/958,752, now U.S. Pat. No. 6,947,737 with an International filing date of Oct. 12, 2001 and entitled "System And Method of Transmitting Data Messages Between Subscriber Units Communicating With/Between Complementary/Disparate Networks", which is a U.S. National Phase Application Under 35 U.S.C. 371 and claims priority to International Application No. PCT/US00/35513, also having a filing date of Dec. 29, 2000, which in turn claims priority from U.S. provisional application Ser. No. 60/173,742 filed on Dec. 30, 1999 and entitled "(1) ACE Advantages, (2) ACE Redundancy, (3) ACE Manager Problem Diagnosis Tool, (4) Bell Mobility (Canada) Connectivity, (5) Fixed Point Polling Service". Application Ser. Nos. 09/958,752 and 60/173,742 are incorporated herein by reference.

BACKGROUND OF THE INVENTION

1. Field of the Invention

The present invention relates generally to a system and method of enabling a network that uses radio frequency (RF) communication to have multiple host connections on diverse nodes within a home network and/or within a complementary network. More particularly, the present invention relates to a system and method of automatically routing messages to an accessible connection in the event of a failure such that the redundant host connection can either be active all the time (e.g., round-robin between available connections) and/or configured as a hot standby (e.g., routed to backup when the primary host computer and/or routing node associated therewith is down), and optionally utilizing a backup queue manager in the event that the primary queue manager is unavailable for any reason.

2. Background Description

FIGS. 1–3 show a prior art radio frequency (RF) transmission system 100, as disclosed in U.S. Pat. No. 5,819,172, incorporated herein by reference, for transmitting information from one of a plurality of originating processors A–N to at least one of a plurality of destination processors (A–N) which may be transported during operation. The system 100 includes: at least one gateway switch 150 that stores information received from one of the at least one originating processor prior to transmission of the information to the at least one destination processor; a RF information transmission network 130 for transmitting stored information received from one of the at least one gateway switch 150 by RF transmission to at least one destination processor; and at least one interface switch 162 that connects a gateway switch 150 to the RF transmission network 130 and transmits stored information received from one of the at least one gateway switch 150 to the RF information transmission network 130.

The information is transmitted to a receiving interface switch by the electronic mail system in response to an address of the receiving interface switch which has been added to the information originated by the originating processor by either the originating processor or gateway switch 150. The information is transmitted from the receiving interface switch to the RF information transmission network 130 with an address of the destination processor to receive the information which has been added by either the originating processor, a gateway switch or the receiving interface switch.

More particularly, FIG. 2 illustrates a block diagram of the connection between a plurality of gateway switches with mailboxes 150 in different electronic mail systems to the RF information transmission network 130. Multiple gateway switches with mailboxes 150 from a single electronic mail system 1–N may be connected to each interface switch 162 instead of the connection of a single gateway switch with a mailbox to a single interface switch as illustrated. A plurality of interface switches 162 connect information transmitted from at least one electronic mail system as illustrated in FIG. 1. Optionally, a plurality of electronic mail systems 1–N are connected to a data input port of the RF information transmission system which is preferably hub switch 116. The dotted line communication paths 163 illustrate optional information transmissions in which information from a plurality of different electronic mail systems is concentrated at a single interface switch as illustrated in FIG. 2. The dotted line communication paths 163 illustrate connections to additional gateway switches with mailboxes 150 within electronic mail systems 1–N.

The interface switches 162 function as a security check to determine that information transmissions originating from a gateway switch with mailbox 150 represent transmissions which should be coupled to a hub switch 116 of the RF information transmission network 130. The security check is performed by the interface switch 162 comparing the identification number of the RF receiver 119 which has been added by either an originating processor A–N or a gateway switch with mailboxes 150 with permissible identification numbers or the interface switch performing the addition of the identification number.

The interface switch 162 also removes information added by the electronic mail system 1–N to the information originated by the originating processor A–N from the stored information received from one of the gateway switches 150, and adds information used by the RF information transmission network 130 during transmission of the information originated at the originating processor to a RF receiver 119 in the RF information transmission network 130 which receives the information and transfers it to the destination processor A–N. Additionally, the interface switch 162 encodes data, which is required to format the display of the cathode ray tube (CRT) of the destination processor for the electronic mail system to which the destination processor is connected, in the form of a character or characters which are decoded by either the RF receiver 119 or the destination processor A–N. This information is added in decoded form back to the information which is processed by the destination processor with a format of the electronic mail system to which the destination processor A–N is connected.

The interface switches 162 also function to store information which has been stored by at least one gateway switch 150 that is received from a plurality of originating processors, and assemble the information from a plurality of originating processors into a packet having a predetermined format and transmit the packet to the hub switch 116 within the RF information transmission network 130. The hub switch is the preferable node in the RF information transmission network to which communications from the gateway switches 150 should be transmitted as a consequence of it having jurisdiction over both local access and transport area (LATA) switches 114 and the local switches 112 in the RF information transmission network, which results in lesser network overhead.

The hub switch 116 receives the packet from the receiving interface switch 162 and disassembles the packet into information from the plurality of originating processors. The originating processors are either within a single electronic mail system such as system 100, or from a plurality of electronic mail systems, such as systems 1–N, or from outside of any electronic mail system from at least one additional processor 312 which is connected directly to interface switch 162 to originate information to be transmitted to a destination processor A–N in an electronic mail system as described below. The RF information transmission network 130 transmits the disassembled information from the hub switch 116, including the identification number of the RF receiver 119 transferring information, to the destination processor A–N to a local switch 112 storing the file identified by the identification number and any destination of the RF receiver in the RF information transmission network to which the information and identification number is to be transmitted by the RF information transmission network, and adds any destination of the RF receiver to the information. The RF information transmission network, in response to any added destination, transmits the information and identification number to the destination for RF broadcast to the RF receiver 119 for transfer to the destination processor A–N.

The information is transmitted to a receiving interface switch 162 from one or more gateway switches 150 by one or more electronic mail systems 1–N in response to an address of the receiving interface switch which has been added to the information originated by the originating processor by either the originating processor or gateway switch. The information is transmitted from the receiving interface switch 162 to the RF information transmission network with an address of the destination processor, such as a name of a user of the destination processor A–N, to receive the information which has been added by either the originating processor A–N, a gateway switch 150 or the receiving interface switch 162.

Preferably, the address of the receiving interface switch is a code word, such as "TF-MOBOX", which is recognized throughout the electronic mail system when appended to information as directing the information to be transmitted to the interface switch 162. The address of the destination processor is preferably the identification number of the RF receiver 119 within the RF information transmission network 130. The address of the receiving interface switch may be added to the information originated by the originating processor, by a gateway switch 150 or by the originating processor A–N. The address of the receiving interface switch 162 may be added to the information by matching an identification of the destination processor A–N which may be the name of the individual utilizing the processor or some other information to add an address of an interface switch such as the aforementioned "TF-MOBOX" stored with the matched identification of the destination processor to the information as the address of the receiving interface switch.

Alternatively, the originating processor may be used to add the address of the receiving interface switch 162 by inputting the address of the receiving interface switch (TF-MOBOX) along with an identification of the destination processor A–N (name of recipient using the processor).

The originating processor A–N may also add the address of the receiving interface switch 162 by matching an identification of the destination processor (name of the user of the processor) with a stored identification of a destination processor and adding an address of the interface switch (TF-MOBOX) stored with the matched identification of the destination processor to the information as the address of the receiving interface switch.

The identification number may be added to the information originated by the originating processor or, alternatively, maybe added by the originating processor by matching an identification of the destination processor (the name of the user of the processor) with a stored identification of a destination processor (the authorized user of the destination processor) and adding an identification number stored with the matched identification of the destination processor to the information as the identification number of the RF receiver 119. Alternatively, the aforementioned matching process may be performed by either the gateway switch 150 or the interface switch 162. The additional processors 312 originates information from outside of any electronic mail system.

Processors 312 provide an address of at least one destination processor in an electronic mail system, such as the name of the user, to receive information transmitted by the RF information transmission system 130, or an identification number of the RF receiver 119 receiving information and transferring the information to the destination processor. The interface switch 162 which receives the information from each processor 312 adds information used by the RF information transmission network 130 during transmission of the information to the RF receiver 119 receiving the information in the same manner as described above with respect to the interface switch 162.

Processors 312 are only required to have a telephone modem and support programming to format information for RF transmission to a destination processor A–N within any one of one or more electronic mail systems 1–N. The processors 312 are not required to have the necessary electronic mail system software present in originating processors A–N or interconnections with an electronic mail system. As a result of the connection to the interface switch 162, information originating from the additional processors 312 may be transmitted by RF transmission to a destination processor A–N within any one or a plurality of electronic mail systems with the user of the processor 312, the processor 312 or the interface switch 162 only having to supply an identification number of the receiver 119 to input information into the RF information transmission system 130 for RF transmission to a destination processor.

The difference between originating information by one of the additional processors 312 outside of any electronic mail system and originating information by one of the processors within one of the electronic mail systems is that the direct connection of the additional processor to the interface switch 162 eliminates the requirement for the adding of an address of the interface switch 162 which is required by the electronic mail systems to forward the information to the interface switch where necessary formatting of the information to be compatible with the RF information transmission system is performed. The interface switch 162 packetizes information originating from the additional processors 312 in the same manner as described above with respect to information originating from within an electronic mail system.

Information from within an electronic mail system and originating from additional processors 312 outside of the electronic mail system may be formatted into the same packets which are forwarded to the hub switch 116. Additionally, interface switch 162 may be connected only to the additional processors 312 to provide an interface only for processors outside of any electronic mail system to destination processors A–N within one or more electronic mail systems 1–N. The only information which is necessary to be inputted by the additional processors 312 is the address of the destination processor (user of the processor). The addition of the identification number of the receiver 119 may be added by matching of an identification of the destination processor with stored destination processors within the additional processor 312, or the interface switch 162 with an identification number of the receiver 119 stored with an identification of a destination processor A–N used as an identification of the destination processor upon a match having been made.

U.S. Pat. No. 5,819,172 does not, however, generally relate to, for example, a system and method of enabling a network that uses radio frequency (RF) communication to have multiple host connections on diverse nodes within a home network and/or within a complementary network. Nor does U.S. Pat. No. 5,819,172 relate, for example, to a system and method of automatically routing messages to an accessible connection in the event of a failure such that the redundant host connection can either be active all the time (e.g., round-robin between available connections) and/or configured as a hot standby (e.g., routed to backup only when the primary is down), and optionally utilize a backup queue manager in the event that the primary queue manager is unavailable for any reason.

FIG. 4 is a prior art diagram from U.S. Pat. No. 5,940,771, incorporated herein by reference, which illustrates the basic communication pathways and spatial relationships between a host computer, base stations and roaming terminals. Particularly, a host computer 411 and roaming terminals 413, 415 and 417 indirectly communicate through base stations 419 and 421.

The base stations 419 and 421 receive communications via one link medium and relay those communications along another. Particularly, a "hard-wired" connection such as an IEEE 802.3 (Ethernet) interface provides a link 423 to host computer 411, while radio frequency (RF) transmission provides the link to the roaming terminals 413, 415 and 417.

If the remote terminals 413, 415 and 417 are within the RF range of each other, they can use direct RF transmission as the link. If they are not within RF range, an indirect communication link must be found through the base stations 419 and 421. The RF range of the base stations 419 and 421 is illustrated in FIG. 4 by the respective circular boundaries 425 and 427. The boundaries 425 and 427 represent the maximum radial distance from the base stations 419 and 421 that RF communications can be maintained.

In one preferred embodiment, the host computer 411 can be either an IBM AS400 or 3090 mainframe. The base stations 419 and 421 are NORAND RB4000 products and the roaming terminals 415, 417 and 419 are NORAND RT1100 products.

Although only one host computer, two base stations and three roaming terminals are shown for simplicity, the use of additional host units, many more base stations and hundreds of roaming terminals are contemplated. Instead of the "hard-wired" Ethernet interface, it is also contemplated that the entire link 423, or any portion thereof, can be maintained using RF transmissions. In such situations, because of the range limitations associated with an RF link, it may be necessary for several base stations to relay communications between the host computer 411 and the roaming terminals 413, 415 and 417. Alternatively stated, the communications "hop" from one base station to the next until the destination is reached.

As the number of base stations increase, the number of possible "hopping" pathways also increase. A backward-learning, spanning tree algorithm is used so as to select the "hopping" pathway with the lowest "cost" to a given destination as detailed above. To summarize, a "cost" is assigned to every direct communication link in the network. This "cost" factor takes into account the communication bandwidth of a particular link. Next, the spanning tree algorithm using backward learning identifies the "hopping" pathway of lowest "cost" from any source to any destination. Whenever any direct link is faulty or a "hopping point" (a base station for example) is moved or breaks down, an alternate low "cost" pathway can be used. This provides an inherent redundancy to the network.

Roaming terminals 415, 417 and 419 collect data that must be communicated to the host computer 411. This data is collected either via respective bar code readers 429, 431 and 433 or keyboards 435, 437 and 439. U.S. Pat. Nos. 4,910,794, 4,924,462, and 4,940,974 provide a further description of these readers and data collection, and are incorporated herein by reference. In addition, bar code reading requires high system clock rates in the roaming terminals during data gathering to provide decoding of bar code scans at an acceptable rate. However, the high clock rates also cause the generation of digital noise in and around the roaming terminals. This noise can effect transmission and reception at the roaming terminal causing a reduction in the effective communication range. This problem is solved by using a dual clock rate. The terminal is operated normally at a slow system clock rate to minimize the generation of digital noise, and it is switched to a fast clock rate during bar code scanning to allow the data obtained from the bar code scan to be processed at a higher rate. This lets the RF data link coexist with the need for and the hardware support for bar code scan decoding.

The terminals 413, 415 and 417 can also request information from the host computer 411 or from other roaming terminals. Similarly, the host computer 411 may desire to communicate with the roaming terminals 413, 415 and 417 in order to download configuration information, database information or to send commands.

Before communication can be initially established, the roaming terminals 413, 415 and 417 must first listen for hello-messages from the base stations 419 and 421. The base station 419 and 421 both send out hello-messages approximately once every second. The hello-messages identify the sending base station along with its current loading and associated "cost".

The roaming terminals 413, 415 and 417 attempt to detect every possible hello-message from any base station within range. This requires that the hello-message listening period be at least as long as the maximum time between hello-messages sent by any single base station. For example, the terminals 413 and 417 would respectively receive a hello-message from the base stations 419 and 421, while the terminal 415 would receive two hello-messages: one from the base stations 419 and one from the station 421. Only those hello-messages that meet a minimum "signal strength" threshold are further considered. All weaker hello-messages are ignored.

As spatially represented in FIG. 4, upon receiving hello-messages from a single base station, the roaming terminals 413 and 417 can immediately initiate communication with the host computer 411 by "attaching" to their respectively identified base stations 419 and 421. The roaming terminal 415, however, which received two sufficiently strong hello-messages signals, must select either base station 419 or 421 before "attaching".

To make this selection, the roaming terminal 415 must initially consider the "cost". Specifically, terminal 415 must select the base station which has the lowest "cost". If the "costs" are equal, terminal 415 must select the base station whose received hello-message has the highest "signal strength". If the corresponding "signal strengths" also prove to be equal, the roaming terminal 415 selects the base station with the highest user defined "priority". This priority can be preset by the user based on both the spatial layout and the nature of the components being used. Finally, if these factors all prove equal, the terminal 415 merely selects the base station with the lowest "preset number". Each base station is randomly assigned a unique "preset number" upon its manufacture or during its installation onto the network.

Assuming that station 419 and 421 have the same "cost" and "signal strength" but that station 419 has the highest user defined "priority", gravitation in the overlapping region occurs toward the base station 419. In this way, the base station 419 can better regulate communication in the overlapping RF regions with minimal channel contention.

More particularly, the user set "priority" assigned to a base station could also be determined based on the spatial layout of competing base stations. The higher "priority" base stations can be surrounded by lower "priority" base stations and vice versa in a pattern defined by the total area being covered so as to cause as much migration as possible onto the higher "priority" base stations and away from the lower "priority" base stations. Similarly, in determining high "priority", consideration can also be given to the base stations ordinarily containing high concentration of roaming terminals.

It is further contemplated that factors which indicate the current load on base stations 419 and 421 could also be considered in the selection by the roaming terminal 415. First, if heavy loading is considered a negative factor, the roaming terminals 413, 415 and 417 that pass within the overlapping region defined by boundaries 425 and 427 would gravitate toward base stations with the lightest load. Although this balances the loading between base stations, it causes greater channel contention problems in the overlapping regions. Second, if heavy loading is considered a positive factor, the roaming terminals would gravitate toward base stations with the heaviest load. In this manner, a heavily loaded base station could better manage communication when surrounded by lightly loaded stations.

As roaming terminals 413, 415 and 417 move within the confines of boundaries 425 and 427, they often need to re-evaluate their base station selection. Instead of waiting until RF communication with their selected base station is entirely lost, the remote terminals 413, 415 and 417 can periodically re-evaluate the "cost" and "signal strength" of either the hello-messages or any other RF transmission sent from other base stations. Upon selecting a new base station, the roaming terminals merely "attach" to their new selection. Furthermore, in addition to or in place of this periodic re-evaluation described in the preferred embodiment, a decline in the selected base station's "signal strength" might also be used as a factor for initiating a re-evaluation.

In a communication system such as that shown in FIG. 4, one or more of the base stations may be selected to transmit an RTC heartbeat, which is the system synchronizing signal. Responses from terminals in the service area are monitored by all of the base stations that receive signals from the terminals. In most cases, terminals will be at different distances from each of the plurality of base stations, and the resulting differences in received signal strengths at the receiving terminals will eliminate the effects of signal collision by FM capture. However, in some instances, collisions will still occur at some base stations.

Base stations can be networked, as illustrated by communication link 423, to allow the coordination of polling of terminals that have identified themselves to the base stations during their response intervals. The use of information about the strength of signals received at the base stations allows the network to adjust broadcast signal strengths so as to poll receiving terminals simultaneously with a minimum risk of collision. This provides a number of advantages. First, a smaller number of collisions will reduce the number of delays in response due to collisions. If contention polling is used, this means that the number of slots can be reduced, thus reducing overhead. The system also allows for simultaneous communication on a single frequency when two or more terminals are so located with respect to their base stations that the same-frequency communications will not interfere with each other. Finally, the system allows UHF and spread-spectrum communication systems to share the same local-area network.

However, unlike the present invention which is directed to providing a system and method for backup and/or redundant host routing and/or message queuing when wireless device is within a home network and/or a complementary network, the system as described in U.S. Pat. No. 5,940,751 does not allow a wireless device to transmit a message between disparate networks. Moreover, U.S. Pat. No. 5,940,771 does not provide a backup and/or redundant routing path between a wireless device and a destination host. Accordingly, there is a need for a system and method that provides such features.

SUMMARY OF THE INVENTION

It is a feature and advantage of the present invention to provide redundancy and eliminate single points of failure within a system/network that utilizes radio frequency (RF) communication within a primary network and/or a complementary network.

It is another feature and advantage of the present invention to allow system users to have multiple host connections on diverse nodes within a primary network and/or a complementary network.

It is yet another feature and advantage of the present invention to provide network nodes that automatically route to an accessible connection in the event of a node failure within a primary network and/or a complementary network;

It is still another feature and advantage of the present invention to provide routing nodes that can be configured in either an active mode (e.g., round-robin between available connections) and/or as a hot standby (e.g., route to backup node only when the designated primary node is down) within a primary network and/or a complementary network.

It is another feature and advantage of the present invention to provide a backup queue manager that can be used to route messages to their destination within a primary network and/or a complementary network.

In a first embodiment, the present invention comprises a wireless communication system enabling a wireless or non-wireless device to transmit data via first and second routing switches to a first computer associated with at least the second routing switch, subsequent to determining that a second computer associated with the first and second routing switches cannot receive the data. More particularly, the system comprises a first routing switch, associated with the first computer that receives data from a device. The system comprises: a first server for at least one of adding and deleting a radio frequency header respectively to and from the data; a second server, communicable with the first server, for reading a profile of the device; a router, communicable with the second server, for adding a routing header to the data; an optional queue manager, communicable with the router, for determining a time to transmit the data to at least one of the second computer and the second routing switch; and a protocol server, communicable with the queue manager, for adding a protocol header to the data compatible with the host computer to which the data is transmitted. The system also comprises a second routing switch communicable with at least the first routing switch and the second computer. In alternate embodiments, the above referenced servers, routers and/or computers may be combined into single servers, routers, computers performing combined functionality. Alternatively, the servers, routers, and/or computers may include multiple processors for distributed and/or parallel processing. Other standard equipment may be used in conjunction with and/or instead of the routers and switches that provide the overall functionality described herein.

In operation, the first routing switch receives the data from the device. The second server reads a profile of the device comprising routing data pertaining to the first host computer and the second host computer to which the device transmits data. The host router adds a first routing header to the data for transmitting at least the data to the first host computer and, upon determining that the first host computer is unresponsive, transmits at least the data to the second routing switch.

The second routing switch adds a second routing header to the data for transmitting at least the data to the first computer. If the data cannot be transmitted to the first computer, a third routing header and is utilized to transmit at least the data to the second computer.

In a second embodiment, the invention comprises a wireless communication system that enables a wireless or non-wireless device to transmit data via first and second routing switches to a first host computer, communicable with the first wireless network, subsequent to determining that a second host computer via a third routing switch cannot receive the data.

In particular, the system comprises a first routing switch that receives data. The first routing switch preferably comprises: a first server for at least one of adding and deleting a radio frequency header respectively to and from the data; a second server, communicable with the first server, for reading a profile of the device; a host router, communicable with the second server, for adding a routing header to the data; and a queue manager, communicable with the host router, for determining a time to transmit the data to at least one of the second host computer and the second routing switch.

A second routing switch is communicable with at least the first routing switch and is associated with the first host computer. A third routing switch, associated with a second host computer, is communicable with the first routing switch and the second routing switch.

In operation, the first routing switch receives data from the device. The second server reads a profile of the device comprising routing data pertaining to at least one of the first host computer and the second host computer to which the device transmits data. The host router adds a first routing header to the data for transmitting at least the data to the second host computer via the third routing switch. The third routing switch, upon determining that the second host computer is unresponsive, adds a second routing header for transmitting at least the data to the first host computer via the second routing switch.

In a third embodiment, the invention comprises a wireless communication system enabling a wireless or non-wireless device associated with at least a first wireless network to transmit data via first and second routing switches to a first host computer in a complementary network, communicable with the first wireless network, subsequent to determining that a second host computer via a third routing switch associated with the first wireless network cannot receive the data.

In particular, the system comprises a first routing switch receiving data from the device. The first routing switch comprises: a first server for at least one of adding and deleting a radio frequency header respectively to and from the data; a second server, communicable with the first server, for reading a profile of the device; a host router, communicable with the second server, for adding a routing header to the data; a queue manager, communicable with the host router, for determining a time to transmit the data to at least one of the second host computer and the second routing switch; and a first protocol server, communicable with the queue manager, for adding a protocol header to the data compatible with a host computer to which the data is transmitted within the first network.

The system further comprises a second protocol server, communicable with the host router, for adding a protocol header to the data compatible with a host computer to which the data is transmitted within the complementary network. A second routing switch is associated with the complementary network, communicable with at least the first routing switch and the first host computer. A third routing switch, associated with the second host computer, is communicable with the first routing switch and the second routing switch.

In operation, the second server reads a profile of the device comprising routing data pertaining to at least one of the first host computer and the second host computer to which the device transmits data. The first protocol server adds a first routing header for transmission of the data to the second host computer via said third routing switch. The third routing switch receives the data from the device via the first routing switch and, upon determining that the second host computer is unresponsive, adds a second routing header associated with the second routing switch for transmitting the data to the first host computer. The third routing switch preferably comprises a server for adding a radio frequency header to the data.

In a fourth embodiment, the invention comprises a wireless communication system enabling a wireless or non-wireless device to transmit data via first and second routing switches to a first host computer, subsequent to determining that a third routing switch cannot receive the data.

The system comprises a first routing switch that receives data from the device. The first routing switch preferably comprises: a first server for at least one of adding and deleting a radio frequency header respectively to and from the data; a second server, communicable with the first server, for reading a profile of the device; a host router, communicable with the second server, for adding a routing header to the data; a queue manager, communicable with the host router, for determining a time to transmit the data to the third routing switch; and a protocol server, communicable with the at least one queue manager, for adding a protocol header to the data compatible with a host computer to which the data is transmitted.

A second routing switch is communicable with at least the first routing switch and a first host computer. A third routing switch is associated with a second host computer.

In operation, the first routing switch receives the data from the device, and the second server reads a profile of the device comprising routing data pertaining to at least one of the first host computer and the second host computer to which the device transmits data. The host router adds a first routing header for transmission of the data to the second host computer via the third routing switch. The host router, upon determining that the third routing switch is unresponsive, adds a second routing header for transmitting the data to the first host computer via the second routing switch.

In a fifth embodiment, the invention comprises a wireless communication system enabling a wireless or non-wireless device within a first wireless network to transmit data via first and second routing switches to a first host computer in a complementary network, communicable with the first wireless network, subsequent to determining that a third routing switch associated with the first wireless network cannot receive the data.

The system comprises a first routing switch that receives data from the device. The first routing switch preferably comprises: a first server for at least one of adding and deleting a radio frequency header respectively to and from the data; a second server, communicable with the first server, for reading a profile of the device; a host router, communicable with the second server, for adding a routing header to the data; a queue manager, communicable with the host router, for determining a time to transmit the data to at least one of the second host computer and the second routing switch; a first protocol server, communicable with the queue manager, for adding a protocol header to the data compatible with a host computer to which the data is transmitted within the first network; and a second protocol server, communicable with the host router, for adding a protocol header to the data compatible with a host computer to which the data is transmitted within the complementary network.

The system also comprises a second routing switch associated with the complementary network, communicable with at least the first routing switch and the first host computer. A second server reads a profile of the device comprising routing data pertaining to at least one of the first host computer and the second host computer to which the device transmits data.

The host router adds a first routing header for transmission of the data to the second host computer via the third routing switch. The second routing server, upon determining that the third routing switch is unresponsive, adds a second routing header associated with the second routing switch for transmitting the data to the first host computer in the complementary network. The second routing switch comprises a server for adding a radio frequency header to the data.

In a sixth embodiment, the invention comprises a wireless communication system enabling a device to transmit data alternately between at least a first host computer, connected to a second routing switch, using first and second routing switches, and a second host computer, connected to a third routing switch, using first and third routing switches.

The system comprises a first routing switch that receives data from the device. The first routing switch comprises: a first server for at least one of adding and deleting a radio frequency header respectively to and from the data; a second server, communicable with the first server, for reading a profile of the device; a host router, communicable with the second server, for adding a routing header to the data; a queue manager, communicable with the host router, for determining a time to transmit the data to at least one of the second host computer and the second routing switch; a protocol server, communicable with the queue manager, for adding a protocol header to the data compatible with a host computer to which the data is transmitted.

The system also comprises a second routing switch communicable with at least the first routing switch and the first host computer. A third routing switch is communicable with the first routing switch and the second host computer.

In operation, the first routing switch receives data from the device. The host router determines whether a most recent preceding data transmission eligible for transmission to at least one of the first host computer and the second host computer was received by the first host computer or the second host computer, adds a routing header to the data for transmission of at least the data to the other of the first host computer and the second host computer, and transmits at least the data to the other of the first host computer via said second routing switch and the second host computer via said third routing switch.

In a seventh embodiment, the invention comprises a wireless communication system enabling a wireless or non-wireless device to transmit data alternately between at least a first host computer, connected to a second routing switch associated with a first wireless network, using first and second routing switches, and a second host computer, connected to a third routing switch associated with a second wireless network, using first and third routing switches.

The system comprise a first routing switch, associated with the second wireless network, that receives data from the device. The first routing switch comprises: a first server for deleting a radio frequency header from the data; a second server, communicable with the first server, for reading a profile of the device; a host router, communicable with the second server, for adding a routing header to the data; a queue manager, communicable with the host router, for determining a time to transmit the data to at least the second host computer; a first protocol server, communicable with the at least one queue manager, for adding a protocol header to the data compatible with the second host computer within the second wireless network to which the data is transmitted; a second protocol server, communicable with the at least one queue manager, for adding a protocol header to the data compatible with the first host computer within the first wireless network to which the data is transmitted.

A second routing switch is associated with the first wireless network and communicable with at least the first routing switch and the first host computer. A third routing switch is associated with the second wireless network and communicable with the first routing switch and the second host computer.

In operation, the first routing switch receives data from the device, determines whether a most recent preceding data transmission capable of transmission to at least one of the first host computer and the second host computer was received by the first host computer or the second host computer, and adds a first routing header to the data for transmission of at least the data to the other of said first host computer and said second host computer.

The invention also provides a method that enables a wireless or non-wireless device utilizing a wireless communication system to transmit data via first and second routing switches to a first host computer associated with at least the second routing switch, subsequent to determining that a second host computer associated with the first and second routing switches cannot receive the data.

The method comprises the steps of: receiving data, via, for example, a first routing switch or origination, from a device; reading or accessing a profile of the device; adding, assigning or activating a routing header to the data; determining a time to transmit the data or immediately transmitting the data; and adding, assigning or activating a protocol header to the data compatible with the second host computer to which the data is first transmitted.

Upon determining that the second host computer is unresponsive, the data is transmitted, for example, to the second routing switch or other destination, which adds, assigns or activates a second routing header to the data. The data is transmitted by the second routing switch to the second host computer or other destination. Upon determining that the second host computer is unresponsive, the second routing switch adds, assigns or activates a third routing header to the data, transmits at least the data to the first host computer. The routing headers may be discrete headers or created dynamically and/or pre-determined and waiting activation associated with the data and/or receiving destination.

In another embodiment, the invention provides a method that enables a wireless or non-wireless device to transmit data via first and second routing switches to a first host computer, communicable with the first wireless network, subsequent to determining that a second host computer via a third routing switch cannot receive the data.

The method comprises the steps of: receiving data via a first routing switch from the device; adding a radio frequency header to the data; reading a profile of the device; adding a routing header associated with the second host computer to the data; determining a time at which to transmit the data to the second host computer; and adding a protocol header to the data compatible with the second host computer to which the data is transmitted. Upon determining that the second host computer is unresponsive, a second routing header is added at the first routing switch for transmitting at least the data to the first host computer via the second routing switch.

In another embodiment, the invention provides a method that enables a wireless or non-wireless device associated with at least a first wireless network to transmit data via first and second routing switches to a first host computer in a complementary network, communicable with the first wireless network, subsequent to determining that a second host computer via a third routing switch associated with the first wireless network cannot receive the data.

The method comprises the steps of: receiving data at a first routing switch from the device; adding a radio frequency header to the data; reading a profile of the device; adding a routing header to the data; determining data transmission time; and transmitting the data to the second host computer via said third routing switch. Finally, upon determining that the second host computer is unresponsive, the third routing switch adds a protocol header associated with the second routing switch. The method also optionally comprises the step of transmitting at least the data to the complementary network.

In another embodiment, a method in accordance with the present invention enables a wireless or non-wireless device to transmit data via first and second routing switches to a first host computer, communicable with the first wireless network, subsequent to determining that a third routing switch cannot receive the data.

The method comprises the steps of: receiving data, at a first routing switch, from the device; deleting a radio frequency header from the data; reading a profile of the device; adding a routing header to the data; determining a time at which to transmit the data to at least one of the second routing switch and the third routing switch; adding a protocol header to the data compatible with a host computer to which the data is transmitted; and transmitting at least the data to the third routing switch. Finally, upon determining that the third routing switch is unresponsive, the host router adds a second routing header for transmitting at least the data to the first host computer via the second routing switch.

Another method in accordance with the present invention enables a wireless or non-wireless device within a first wireless network to transmit data via first and second routing switches to a first host computer in a complementary network, communicable with the first wireless network, subsequent to determining that a third routing switch associated with the first wireless network cannot receive the data.

In a preferred embodiment, the method comprises the steps of: receiving at a first routing switch data from the device, and adding a protocol header to the data compatible with the second host computer, associated with the third routing switch, to which the data is initially transmitted. Upon determining that the third routing switch is unresponsive, the first routing switch adds a second routing header associated with the second routing switch for transmitting at least the data to the first host computer in the complementary network. The method optionally comprises the step of adding a radio frequency header by the second switch to the data for transmission of the data to the first host computer.

In yet another embodiment, a method in accordance with the present invention enables a wireless or non-wireless device to transmit data alternately between at least a first host computer, connected to a second routing switch, using first and second routing switches, and a second host computer, connected to a third routing switch, using first and third routing switches.

The method comprises the steps of: receiving at the first routing switch data from the device; adding a radio frequency header to the data; reading a profile of the device; determining a time to transmit the data to at least one of the second routing switch and the third routing switch; adding a protocol header to the data compatible with a host computer to which the data is transmitted; determining whether a most recent preceding data transmission eligible for transmission to at least one of the first host computer and the second host computer was received by the first host computer or the second host computer; adding a routing header to the data for transmission of at least the data to the other of the first host computer and the second host computer; and transmitting at least the data to the other of the first host computer via the second routing switch and the second host computer via the third routing switch.

In another embodiment, a method in accordance with the present invention comprises the steps of enabling a wireless or non-wireless device to transmit data alternately between at least a first host computer, connected to a second routing switch associated with a first wireless network, using first and second routing switches, and a second host computer, connected to a third routing switch associated with a second wireless network, using first and third routing switches.

The method comprises the steps of: transmitting data from the device to the first routing switch; receiving data, at the first routing switch, via the device; determining whether a most recent preceding data transmission capable of transmission to at least one of the first wireless network and the second wireless network was transmitted to the first wireless network or the second wireless network; adding a routing header, corresponding to at least one of the first wireless network and the second wireless network, to the data for transmission of at least the data to the other of the first wireless network and the second wireless network; and transmitting at least the data to the other of the first host computer via the second routing switch and the second host computer via the third routing switch.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other systems and methods for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The Detailed Description including the description of a preferred structure and method as embodying features of the invention will be best understood when read in reference to the accompanying figures wherein.

DETAILED DESCRIPTION

Figure 1:
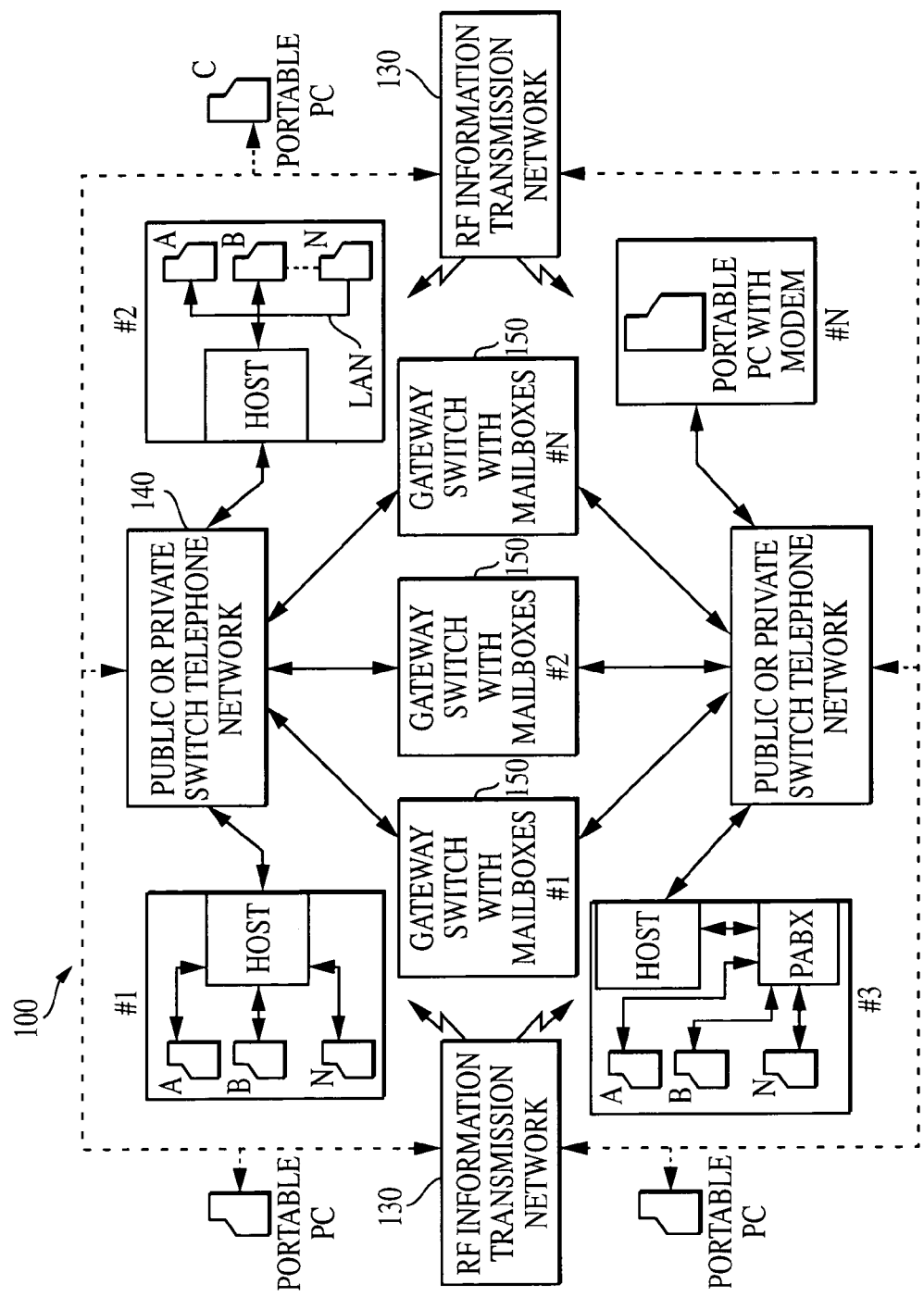
FIG. 1 illustrates a prior art block diagram of a first messaging system.
Figure 2:
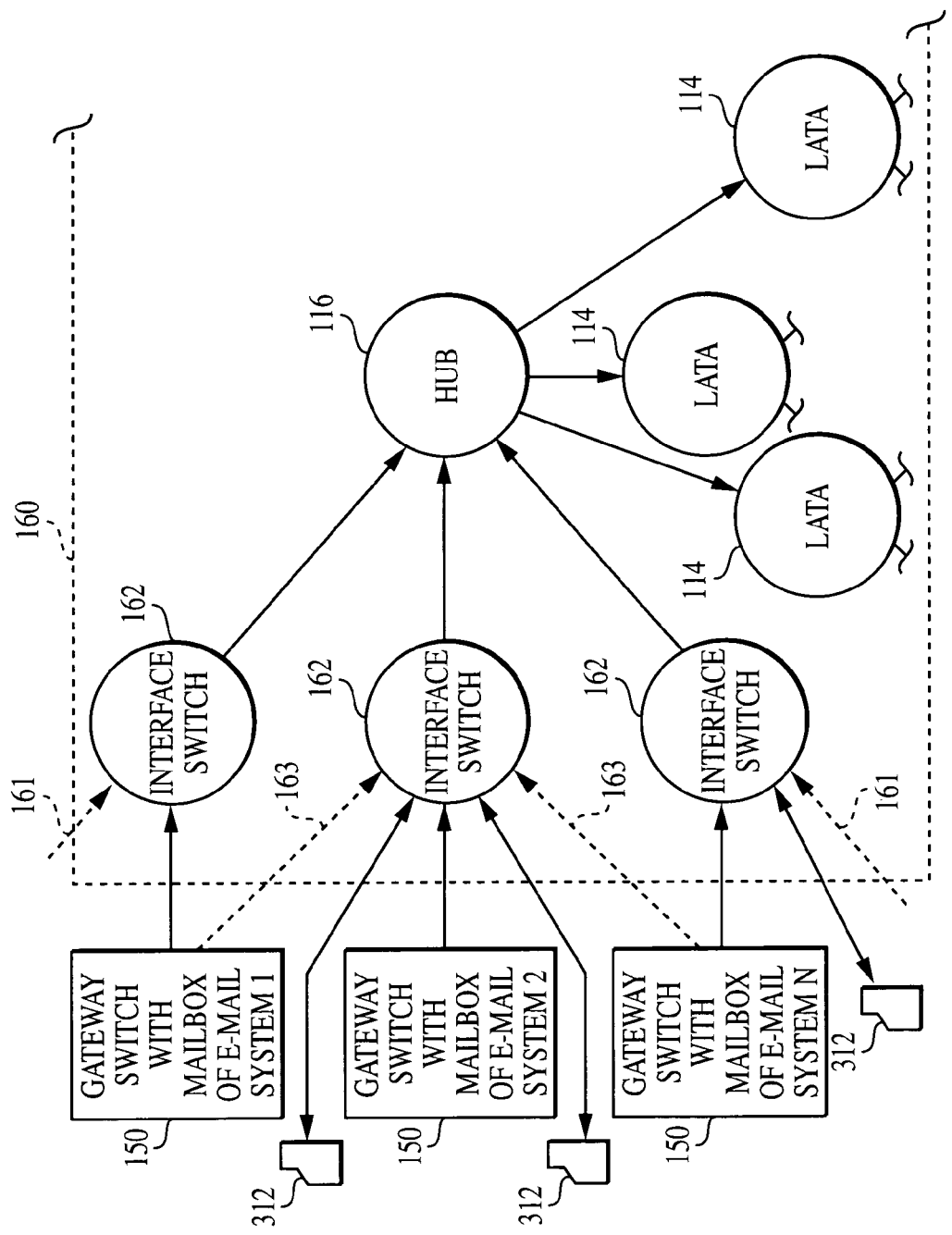
FIG. 2 illustrates a prior art block diagram of the connection of a plurality of electronic mail systems through a plurality of interface switches to an input port of an RF information transmission network.
Figure 3:
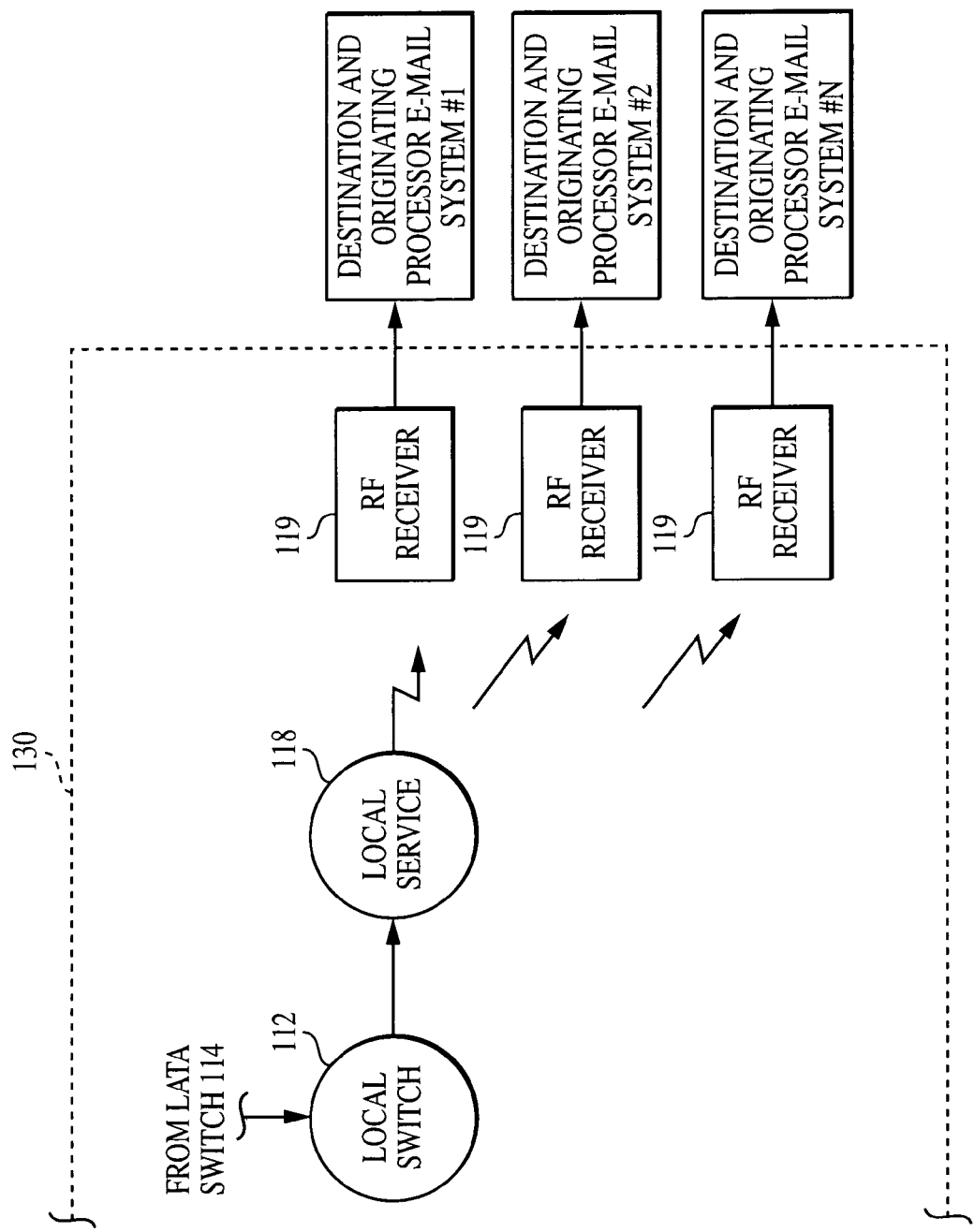
FIG. 3 illustrates a prior art block diagram of the transmission of information originating from a plurality of electronic mail systems to an RF information transmission network to a plurality of destination processors and originating processors within a plurality of electronic mail systems.
Figure 4:
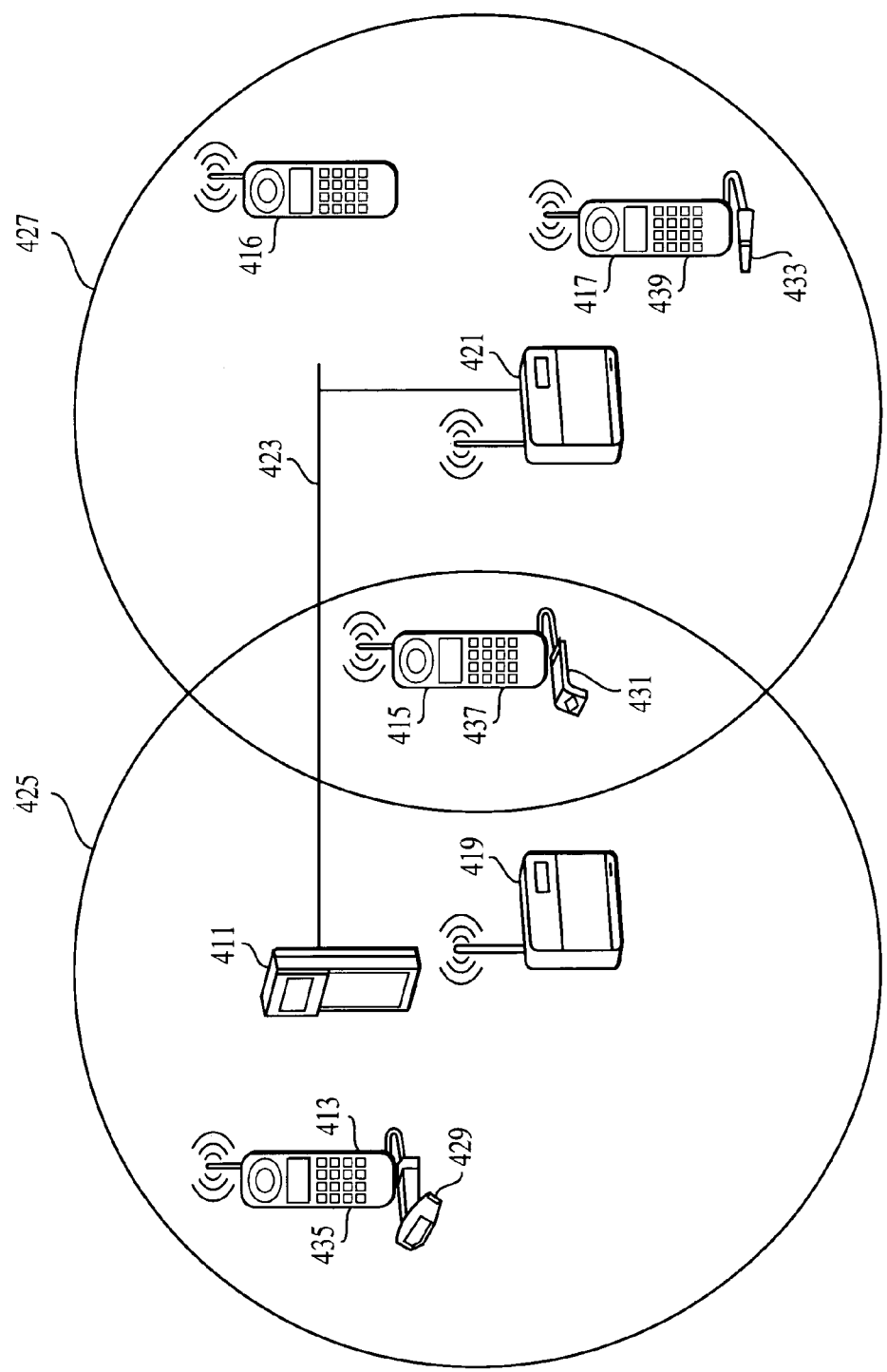
FIG. 4 is a prior art diagram of a second messaging system which illustrates the basic communication pathways and spatial relationships between a host computer, base stations and roaming terminals of the present invention.
Figure 5:
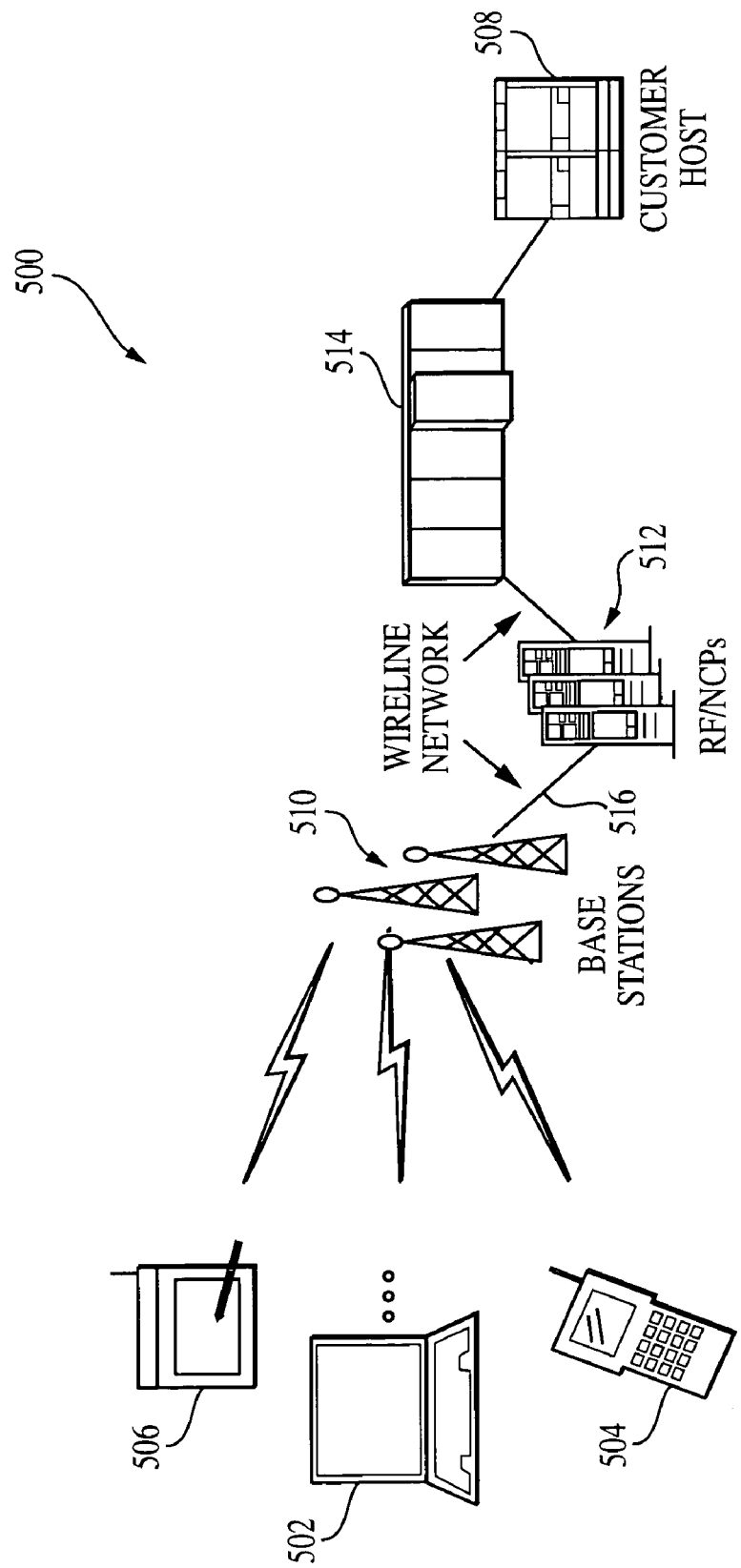
FIG. 5 is a schematically simplified representation of the Motient$^{SM}$ terrestrial communications network.

Reference now will be made in detail to the presently preferred embodiments of the invention. Such embodiments are provided by way of explanation of the invention, which is not intended to be limited thereto. In fact, those of ordinary skill in the art may appreciate upon reading the present specification and viewing the present drawings that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

The Motient$^{SM}$ network 500 is a terrestrial wireless two-way data network that is based on Motorola's Radio Data-Link Access Procedure (RD-LAP) technology. RD-LAP is a radio frequency (RF) protocol used for communicating between wireless devices 502, 504, 506 and base stations 510. It was originally developed and jointly owned by Motorola and IBM. In 1995 Motorola acquired 100 percent ownership of what was then called the ARDIS® (Advanced Radio Data Information Services) network. In 1998, ARDIS® was acquired by American Mobile Satellite Corporation (now Motient Corporation).

The Motient$^{SM}$ network 500 covers at least ninety percent of the urban business population and more than 500 metropolitan area in the United States, Puerto Rico and the Virgin Islands. Two standard air-interface protocols have been developed for the network 500. The standard Mobile Data Communications-4800 (MDC-4800) protocol provides a 4800 bit/sec service, and the standard RD-LAP protocol provides a 19.2 kbit/sec service.

The network 500 allows SUs such as an intelligent terminal or computing device 502, handheld device 504, and/or other communications device 506 to transmit and/or receive data messages. SUs 502, 504, 506 therefore, typically have a radio frequency (RF) modem for sending and receiving signals. The RF modem utilizes the MDC-4800 and/or RD-LAP protocols to enable SUs to gain access to the Motient$^{SM}$ network 500. In the event a network other than the Motient$^{SM}$ network 500 is utilized, other air-interface communication protocols may be used. For example, if a MOBITEX network is used, the air-interface protocol would utilize Gaussian minimum shift keying (GMSK).

The network 500 has over 2000 base stations (510) that provide service throughout the United States, Puerto Rico, and U.S. Virgin Islands. Each base station 510 covers a radius of approximately 15–20 miles. The base stations 510 are radio frequency towers that transmit or receive radio signals between SUs 502, 504, 506 and the Radio Frequency/Network Control Processors (RF/NCPs) 512. Base stations 510 transmit and receive radio signals, preferably using a narrow band FM transmitter and receiver operating in the 800 MHz frequency band. There are separate frequencies for the transmit path and the receive path; together these two frequencies represent a full duplex channel that normally transmits data at 4800 bps in both directions. Other standard transmission methods may alternatively be used in other standard communication systems.

In operation, for a message "inbound" to the network 500 from a SU 502, 504, 506, the signal is "heard" or received by the base stations 510 and sent over dedicated leased lines 516 to a RF/NCP 512. The network 500 employs an automated roaming capability that allows the free movement of SUs 502, 504, 506 between cities and between multiple channels within a given city. This capability allows the SUs 502, 504, 506 to freely move (roam) across the country and take advantage of all the network services that are available in every locale.

The RF/NCPs 512 are high-speed computers that interconnect multiple base stations 510 with the standard ARDIS® Connect Engine(s) (ACEs) 514. A number of RF/NCPs 512 are located together serving a particular geographical area, each being connected by high speed digital phone service to one of the ACEs 514, which route messages to a destination such as a customer host computer 508 that is directly connected to the network 500 by, for example, a leased telephone line or a value added network.

RF/NCPs 512 manage the RF resources, including the base stations 510 and data sent over the radio channels. Both inbound and outbound channels are managed using different delivery strategies. The RF/NCPs 512 evaluate the strength of the signal received from every wireless device transmission at each base station for each detected inbound data packet. Alternatively, the wireless device or the system may evaluate signal strength and report back to the RF/NCP 512. The RF/NCP 512 then selects the best base station 510 to communicate with that particular wireless device and will send the next outbound message through that base station.

The RF/NCPs 512 also help manage the roaming capability of the network 500. SUs 502, 504, 506 can automatically move (roam) between any of the network 500 frequencies on either of the two protocols (MDC-4800 and RD-LAP 19.2), or between any of the configured network 500 layers that have been configured for in-building or on-street usage. Through periodic transmission of "channel market messages," each SU 502, 504, 506 is provided with the most efficient service available in that area. Each RF/NCP 512 also passes information, via a high speed digital line, relating to source, destination and length of each message to an ACE 514 that enables the network 400 to do network analysis of traffic density at each base station 510.

ACE 514, in turn, passes information back to a RF/NCP 512 concerning whether the SU 502, 504, 506 is properly registered to the network 500 and, if so, what level of service is provided to the respective subscriber 502, 504, 506. The ACEs 514 are general purpose computers that act as the heart of the network 500. The ACEs 514 route messages to the proper destination, store subscriber registration information including entitlement, and perform accounting and billing functions. The ACEs 514 also serve as a point of connectivity to, for example, host 508, perform protocol conversion, and perform network 500 troubleshooting and test functions. A plurality of ACEs 514 are interconnected through dedicated lines, with alternate paths available from each switch as a contingency measure against line interruptions. The linking between host 508 and an ACE 514 is generally accomplished using Transmission Control Protocol/Internet Protocol (TCP/IP), Systems Network Architecture (SNA), or X.25 dedicated circuits.

The wireline network 516 provides communication between the customer host computer 508, the ACEs 514, the RF/NCPs 512, and the base stations 510. The wireline network 516 is equipped with communications equipment that relays customer messages. This equipment includes intelligent multiplexers, leased telephone circuits, high-speed modems or digital service units, and modems for both RF/NCP 512 and host 508 connectivity. Accordingly, the various functionality performed by ACE 514 and the other one or more RF/NCPs 512, and base stations 510 may optionally be distributed in various parts/manners to those network components in accordance with alternative embodiments of the invention.

Inside every cell, the SUs 502, 504, 506 access the network 500 using, for example, a random access method called data sense multiple access (DSMA). Before every transmission, a SU 502, 504, 506 listens to a base station 510 to determine if the base station is busy. The SUs are allowed to transmit only when a base station 510 is not busy and/or have capacity to provide service.

Figure 6:
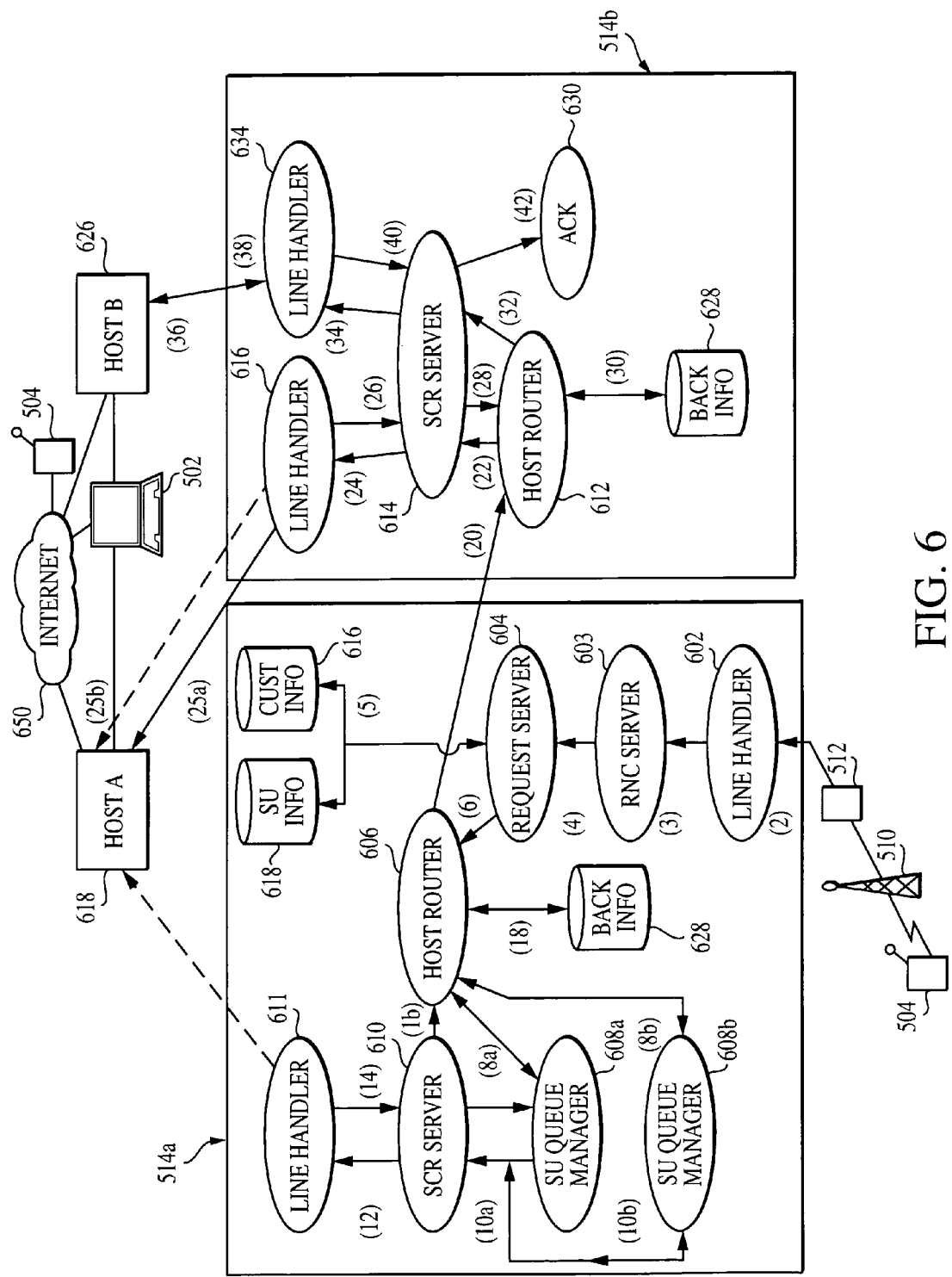
FIG. 6 is an exemplary block diagram of a hot backup configuration, which also illustrates a method in accordance with the present invention.

FIG. 6 is an exemplary block diagram of a hot backup configuration in accordance with the present invention, and also illustrates a method in accordance with the present invention.

In FIGS. 6–12, explanation is generally provided by way of example when ACE 514a receives the data transmitted from SU 502, 504, 506. However, ACE 514a can also analogously transmit data to SUs 502, 504, 506. The system and method in accordance with FIG. 6 provides backup routing in a case where, for example, a line handler 611 associated with a first customer host 618 is down, unavailable or otherwise unresponsive (hereinafter "down"). The line handlers 611, 616, 634 generally determine which protocol(s) the respective hosts 618, 626 use to communicate with the respective ACEs 514a, 514b. When, for example, a line handler 611, 613, 634 is down, the message is routed to a backup ACE 514b that has a second line handler 616 connected to the first host 618. If the second line handler 616 is working, the message can be delivered to host 618. However, if the second line handler 616 is down, the message can then be routed via a third line handler 634 to a second (backup) customer host 626 as a "hot" backup. Line handlers 611, 616, 634 do not need to directly interface to host 618. For example, line handlers 611, 616 and/or 634 can optionally interface with the Internet or other intermediate network (not shown) before a message reaches a host 618, 626.

Although only two hosts 618, 626 and two nodes 514a, 514b are shown in FIG. 6, any number of host connections may be configured as hot backups. In this embodiment, the customer host primary connection (e.g., host 618) is optionally configured as one-to-many physical connections under one logical grouping. Further, a NAK message (e.g., a "host down message") can optionally be transmitted to ACE 514a, ACE 514b and/or the originating SU 502, 504, 506 when all primary and hot backup connections are down or otherwise unresponsive and/or unavailable.

More specifically, a SU 502, 504, 506, via, for example, BTS 510 and RF/RNC 512, transmits (2) data (e.g., a message) to ACE 514a. In operation, it is preferred that a message is sent from a SU 502, 504, 506 and (normally) received by host computer 618 via any of the network 500 supported line protocols (e.g., X.25).

The message, via line handler 602, is routed (3) to RNC server 603, which removes any RF transmission headers from the transmitted message. When transmitting a message to a SU 502, 504, 506, the RNC server 603 also adds an appropriate radio frequency (RF) header for RF transmission. The RNC server then transmits (4) the message to request server 604. Request server 604 reads (5) the SU 502, 504, 506 profile, and adds the primary network 500 information to the internal ACE 514 header. In one embodiment, such information can be stored, for example, in one or more databases. For example, the customer information database 618 can store the type and level of service provided to each customer and/or SU, and/or data pertaining to usage fees and/or billing. The subscriber unit information database 616 can store all valid SU identification numbers (IDs) and the associated host computers.

The request server transmits (6) the data to the host router 606. Host routers 606, 612, can store information pertaining to each SU 502, 504, 506 and, for example, their associated primary host (e.g., host 618) and/or secondary host (e.g., customer host 626). Host router 606 preferably transmits (8a, 8b) the message to SU queue managers 608a, 608b, respectively, which queues the message. When transmitting to host computers 618, 626, other embodiments of the invention can eliminate use of queue managers 608a, 608b, in which case the message could be transmitted directly to SCR server 610. When it is time to transmit the message, one of the SU queue managers (e.g., a primary queue manager 608a) transmits (10a) the message to the binary SCR server 610, which verifies routing headers before attempting to transmit (12) the message to customer host 618 via line handler 611. In the event that SU queue manager 608a is down or otherwise unresponsive, SU queue manager 608b can transmit (10b) the message to SCR server 610.

Binary SCR is a standard protocol that can be used in host based routing when a SU 502, 504, 506 sends messages to and/or receives messages from a host computer 618, 626 connected to the network 500. Host based routing is generally used for applications which require a central repository of information or on-line service. This type of routing assumes that the host computer 618, 626 is in a fixed location and that the host computer 618, 626 application(s) compliments the client application, usually by providing more complex processing. It is preferred that the host computer 618, 626 is connected to the respective ACE 514a, 514b through one of a variety of supported protocols (e.g., SNA LU6.2 or X.25). The physical connection to ACE 514a, 514b can be, for example, a leased line. Alternative standard protocols and/or routing algorithms may optionally be used.

SCR can be used for routing the message from the ACE 514a to host 618 (and 626). SCR is an application header which flows between the network 500 and the customer host 618 (and vice versa). This header is preferably placed at the beginning of the user data. SCR provides for message control and delivery acknowledgment, and can be used with, for example, the SNA LU 6.2, X.25 protocols and TCP/IP protocols. Other standard application headers may alternatively be used that performs or provides the functionality and/or data described herein.

It is preferred that there are at least three types of SCR message headers: Basic Inbound (IB), Basic Acknowledgement (AB), and Basic Outbound (BO). For messages originating at SU 502, 504, 506 via ACE 514a, the IB header is preferably created in SCR server 610. For messages originating at a customer host (e.g., customer host 618), the IB header is preferably created in the customer host 618 application software or communications software and flows from the customer host 618 to the network 500. The network 500 can then direct the message to the appropriate SU 502, 504, 506 via, for example, ACE 514a and/or ACE 514b.

The AB header is created by network 500 (e.g., ACE 514a) and is sent to host 618 (or host 626). An AB header notifies the host 618 that the message sent to a SU 502, 504, 506 was successfully delivered.

An OB header is created by the network 500 (e.g., ACE 514a) for messages sent to the host 618 (and host 626 if operable) from a SU 502, 504, 506. Further information pertaining to the SCR protocol and the Motient$^{SM}$ network can be found in the following documents: *ARDIS Network Connectivity Guide*, June 1994; *DataTAC Wireless Data Networks: Application Development Guide* (Doc. No. 6804111L20-A), First Edition, November 1997; *DataTAC Open Protocol Specifications Standard Context Routing Release* 1.0 (Doc. No. 68P04025C20-A), November 1995); *ARDIS DataTAC 4000 Software Developers Reference Guide*, Revision 2.0, January 1997. Each of the aforementioned documents are incorporated herein by reference in their entirety. Copies of these documents are submitted herewith and/or included in the priority applications incorporated by reference in the related applications section of this application. Other standard message headers may alternatively be used providing the functionality and/or data described herein.

When the message cannot be delivered to the host 618, line handler 611 transmits (14) the message to the SCR server 610 which, in turn, transmits (16) the message to the host router 606. Host router 606 reads (18) backup routing information from database 628, and transmits (20) the message to host router 612 associated with ACE 514b. Host router 612 transmits (22) the message to SCR server 614, which adds a header to facilitate transmission of the message to host 618 via line handler 616. In a first embodiment shown in FIG. 6, the message is successfully transmitted (25) to the host 618 by line handler 616. The message can optionally be subsequently transmitted to, for example, a computing device 502 directly from the host 618 or via the Internet 650, and/or to a SU 504 via the Internet 650.

In a second embodiment shown in FIG. 6, the line handler 616 cannot deliver (25*b*) the message to host 618. Upon determining that the message cannot be delivered to host 618, the line handler 616 transmits (26) the message to SCR server 614 which, in turn, transmits (28) the message to the host router 612. The host router 612 reads (30) alternate routing information from database 628, and transmits (32) the message to SCR server 614, which adds headers to the message. SCR server 614 transmits (34) the message to line handler 634 which, in turn, transmits (36) the message to a backup host (e.g., host 626) as determined by information stored in database 628. The message can optionally be subsequently transmitted to, for example, a computing device 502 directly from the host 618 or via the Internet 650, and/or to a SU 504 via the Internet 650. Line handlers 624, 616 do not need to directly interface to a host 626, 618, respectively. For example, line handlers 624 and/or 616 can optionally interface with the Internet or other intermediate network (not shown) before a message reaches the respective host 626, 618.

When the message has been successfully transmitted, host 626 transmits (38) an acknowledgement to line handler 634 which, in turn, transmits (40) an acknowledgement to SCR server 614. SCR server 614 then transmits (42) the acknowledgement to server 630.

Figure 7:
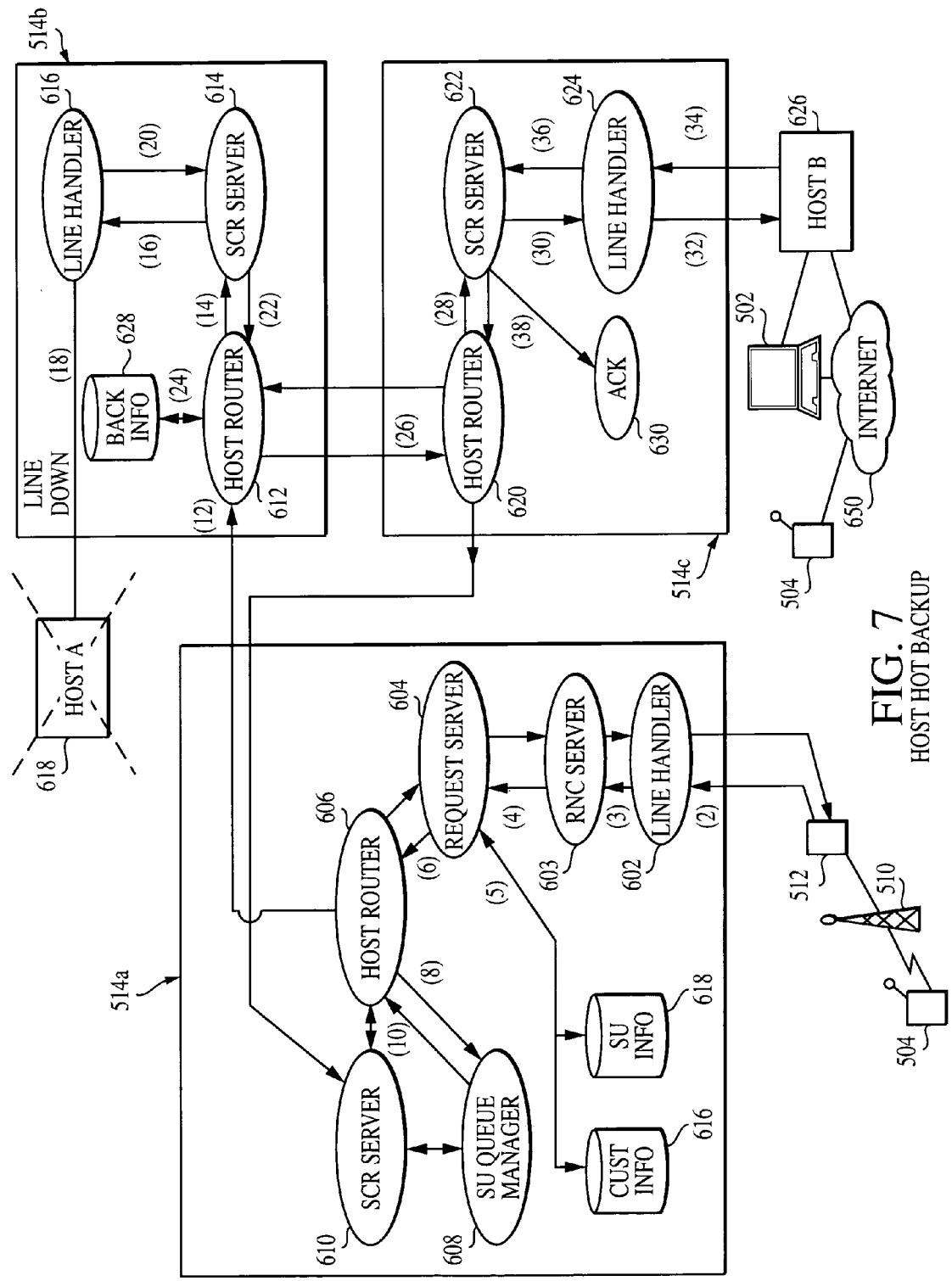
FIG. 7 is an alternate exemplary block diagram of a hot backup configuration, which also illustrates a method in accordance with the present invention.

The system and method in accordance with FIG. 7 provides backup routing in a case where no host computer is associated with the node (e.g., ACE 514*a*) at which the SU 502, 504, 506 originates the transmitted message. More specifically, a SU 502, 504, 506, via, for example, BTS 510 and RF/RNC 512, transmits (2) a message to line handler 602 within ACE 514*a*. The message, via line handler 602, is routed (3) to RNC server 603, which removes any RF transmission headers from the transmitted message. The RNC server 603 then transmits (4) the message to request server 604, which reads (5) the SU 502, 504, 506 profile, and adds the primary network 500 information to the internal ACE 514 header. In one embodiment, such information can be stored, for example, in one or more databases. For example, the customer information database 618 can store the type and level of service provided to each customer and/or SU, and/or data pertaining to usage fees and/or billing. The subscriber unit information database 616 can store all valid SU identification numbers (IDs) and the associated host computers. The request server transmits (6) the data to the host router 606, which determines the location of the intended receiving host (e.g., host 618). Host router 606 optionally transmits (8) the message to SU queue manager 608 for message queuing. In the event SU queue manager is not used, the message can be transmitted directly to host router 612 or host router 620. If no other messages are queued, the SU queue manager 608 retransmits (10) the message to host router 606 for subsequent transmission (12) to customer host router 612 associated with ACE 514*b*. Note that the message is preferably transmitted to SCR server 610 since host 618 is not connected to ACE 514*a*.

Host router 612 transmits (14) the message to SCR server 614, which adds a routing header before transmitting (16) the message to line handler 616 associated with the designated host 618. When the message cannot be delivered (18) to the host 618, the line handler 616 transmits (20) the message to SCR server 614, which removes the transmission header associated with host 618, and transmits (22) the message to host router 612.

Host router 612 reads (24) alternate routing information from database 628, and transmits (26) the message to host router 620 associated with ACE 514*c*. Host router 620 then transmits (28) the message to SCR server 622, which adds a transmission header associated with host 626 to the message. The SCR server transmits (30) the message to line handler 624 which, in turn, transmits (32) the message to a backup host (e.g., host 626) as determined by information stored in database 628. The message can optionally be subsequently transmitted to, for example, a computing device 502 directly from the host 626 or via the Internet 650, and/or to a SU 504 via the Internet 650. Line handlers 624, 616 do not need to directly interface to a host 626, 618, respectively. For example, line handlers 624 and/or 616 can optionally interface with the Internet or other intermediate network (not shown) before a message reaches the respective host 626, 618.

Upon receiving confirmation (34) that the message has been successfully transmitted to host 626, line handler 634 transmits (36) an acknowledgement to SCR server 622 which, in turn, transmits the acknowledgement (38) to acknowledgement server 630. In addition to the routing system and method described, one or more host computers (not shown) can optionally be similarly utilized in conjunction with ACE 514*a*.

Figure 8:
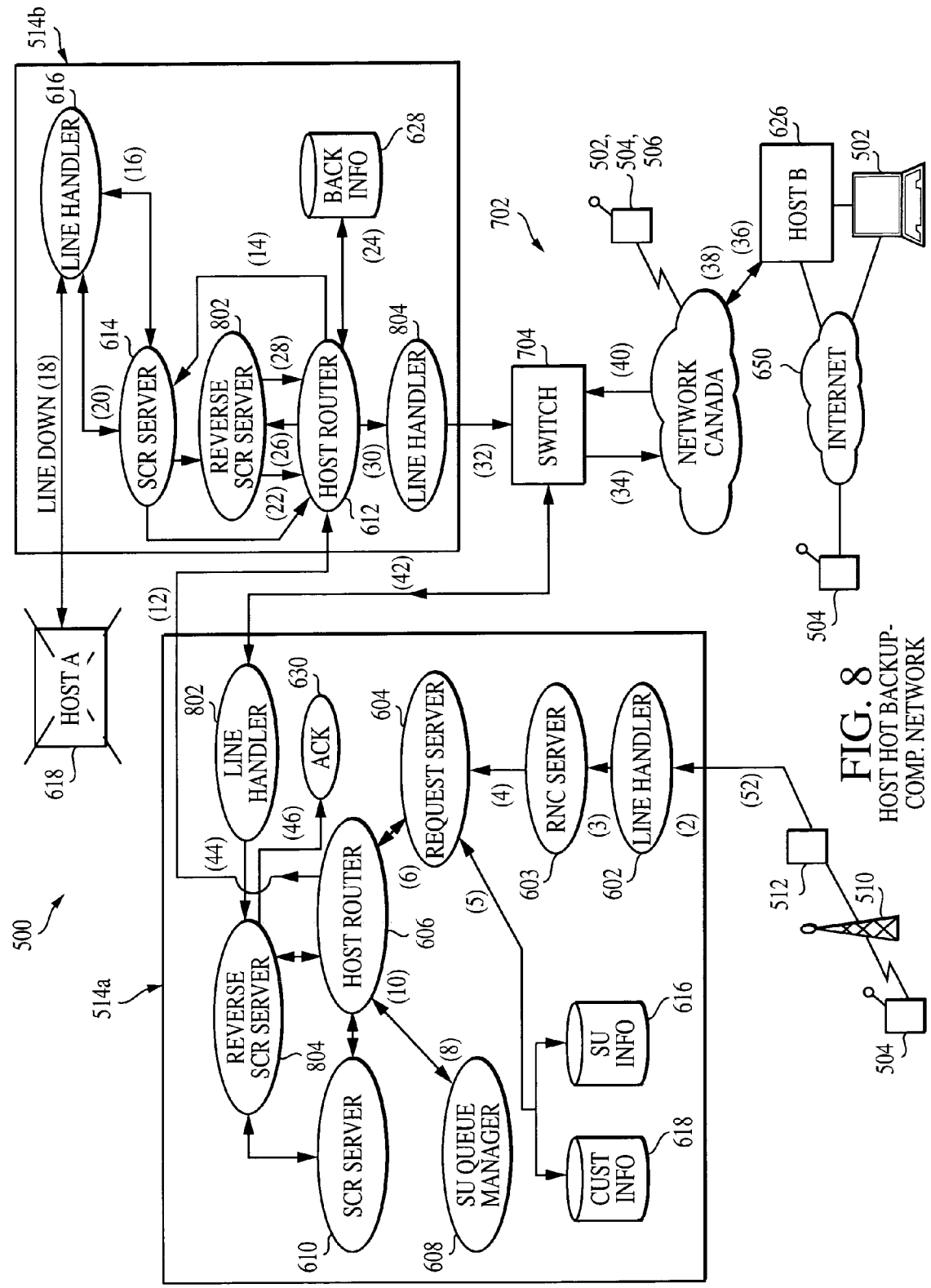
FIG. 8 is an exemplary block diagram of a hot backup configuration that can be used in conjunction with a primary network and a secondary network, which also illustrates a method in accordance with the present invention.

The system and method in accordance with FIG. 8 provides backup routing in a case where no host computer is associated with node (e.g., ACE 514*a*) at which the SU 502, 504, 506 originates the transmitted message, and where the backup host to which the message is transmitted is associated with a complementary network.

More specifically, a SU 502, 504, 506, via, for example, BTS 510 and RF/RNC 512, transmits (2) a message to line handler 602 within ACE 514*a*. The message, via line handler 602, is routed (3) to RNC server 603, which removes any RF transmission headers from the transmitted message. The RNC server 603 then transmits (4) the message to request server 604, which reads (5) the SU 502, 504, 506 profile, and adds the primary network 500 information to the internal ACE 514 header. In one embodiment, such information can be stored, for example, in databases 616 and 618, as previously described.

The request server transmits (6) the data to the host router 606, which determines the location of the intended receiving host (e.g., host 618). Host router 606 optionally transmits (8) the message to SU queue manager 608 for message queuing. If queue manager 608 is not utilized, the message can be transmitted directly to host router 612 or reverse SCR server 804. When it is time for the message to be transmitted, the SU queue manager 608 transmits (10) the message to the host router 608, which transmits (12) the message to host router 612 for subsequent transmission (14) to SCR server 614 associated with ACE 514*b*.

SCR server 614 transmits (16) the message to line handler 616 associated with the designated host 618. When the message cannot be delivered (18) to host 618, the line handler 616 transmits (20) the message to SCR server 614, which removes the transmission header associated with host 618.

Host router 612 receives (22) the message from SCR server 614, reads (24) alternate routing information from database 628, and transmits (26) the message to reverse SCR server 802. Reverse SCR server 802 is utilized in conjunction with a complementary network 702. The reverse SCR server 802 adds appropriate headers to the message so that the network 500 looks like a customer host to the complementary network 702.

Specifically, the reverse SCR server 802 adds, for example, the appropriate IB SCR message header and transmits (28) the message to host router 612 which, in turn, transmits (30) the message to line handler 804. Line handler 804 transmits (32) the message to, for example, switch 704, which preferably views the connection as it would a standard host connection. Switch 704 then transmits (34) the message to the network 702 as it would any other message to the designated SU 502, 504, 506 and/or host 626. The message can optionally be subsequently transmitted to, for example, a computing device 502 directly from the host 626 or via the Internet 650, and/or to a SU 504 via the Internet 650. Host 626 does not need to directly interface to computing device 502. For example, host 626 can optionally interface with the Internet or other intermediate network (not shown) before a message reaches computing device 502.

Upon receiving confirmation (38) that the message has been successfully transmitted to host 626 (or SU 502, 504, 506), the network 702 transmits (40) an acknowledgement to switch 704 which, in turn, transmits (42) the acknowledgement to line handler 802. Line handler 802 then transmits (44) the acknowledgement to reverse SCR server 706 for subsequent storage (46) in acknowledgement server 630.

A SU 502, 504, 506 or host computer 632 in a complementary network 702 can also transmit to a SU in the primary network 700. In this case, the complementary network 702, in effect, becomes functionally equivalent to the primary network 700. As such, switch 704 (or equivalent thereof) may need to be physically and/or logically modified to provide functionality similar to, or substantially similar to, ACE 514a and/or ACE 514b. That is, when the primary network 500 transmits to a secondary network 702, no modification of the secondary network 702 is required since the primary network 500 appears as any other host would to the secondary network. However, when the secondary network 702 is transmitting to the primary network 500, and also wants to provide the features of the present invention to its associated or registered SUs or customers, the secondary network 702 may be required to have or optionally includes a functionality similar to ACEs 514a, 514b to enable SU 502, 504, 506 to transmit a message between the designated secondary network (e.g., 702) and one or more other networks (e.g., 500).

A SU 502, 504, 506 that roams between the primary network 700 and the secondary network 702 will preferably or optionally be registered using standard procedures and/or real-time via standard identification procedures with each respective network. The secondary network 702 could also be a satellite network such as the Bell Mobility network or other communications network. Further, two or more complementary networks 702 can be utilized in accordance with the present invention.

It should be further understood that the connection of the ACE 514b to switch 704 is perceived by the secondary network 702 as it would any other supported connection (e.g., X.25). That is, in accordance with one embodiment of the present invention, it is preferred that the ACE 514b appear as a host to a switch 704 (or equivalent thereof) of a complementary network 702.

Another embodiment of the present invention contemplates the use of a bridge connection between the primary 500 and secondary 702 networks, so that the interface that connects the respective primary network 500 and secondary network 702 to the bridge have the same address.

While the embodiment described in FIG. 8 has focused one specific network configuration, other network configurations are possible and may be used with the present invention to implement the functionality and features described herein. For example, instead of using a host-based routing scheme as described above, the ACE 514 may also route from a first SU 502, 504, 506 to a receiving SU 502, 504, 506 in the complementary network 702, without using a host computer 618, 626, by using a conventional e-mail protocol such as the Post Office Protocol (e.g., POP3, POP4, etc.) or Simple Mail Transfer Protocol (SMTP). In this case, the Reverse SCR server 802 can utilize, for example, the POP3 and/or POP4 and/or SMTP protocol, rather than the SCR. In addition to the routing system and method described, one or more host computers (not shown) can optionally be similarly utilized in conjunction with ACE 514a. If the message is transmitted to a SU 502, 504, 506 in lieu of a host computer 618, 626, it is preferred that SU queue manager 608 be utilized.

Figure 9:
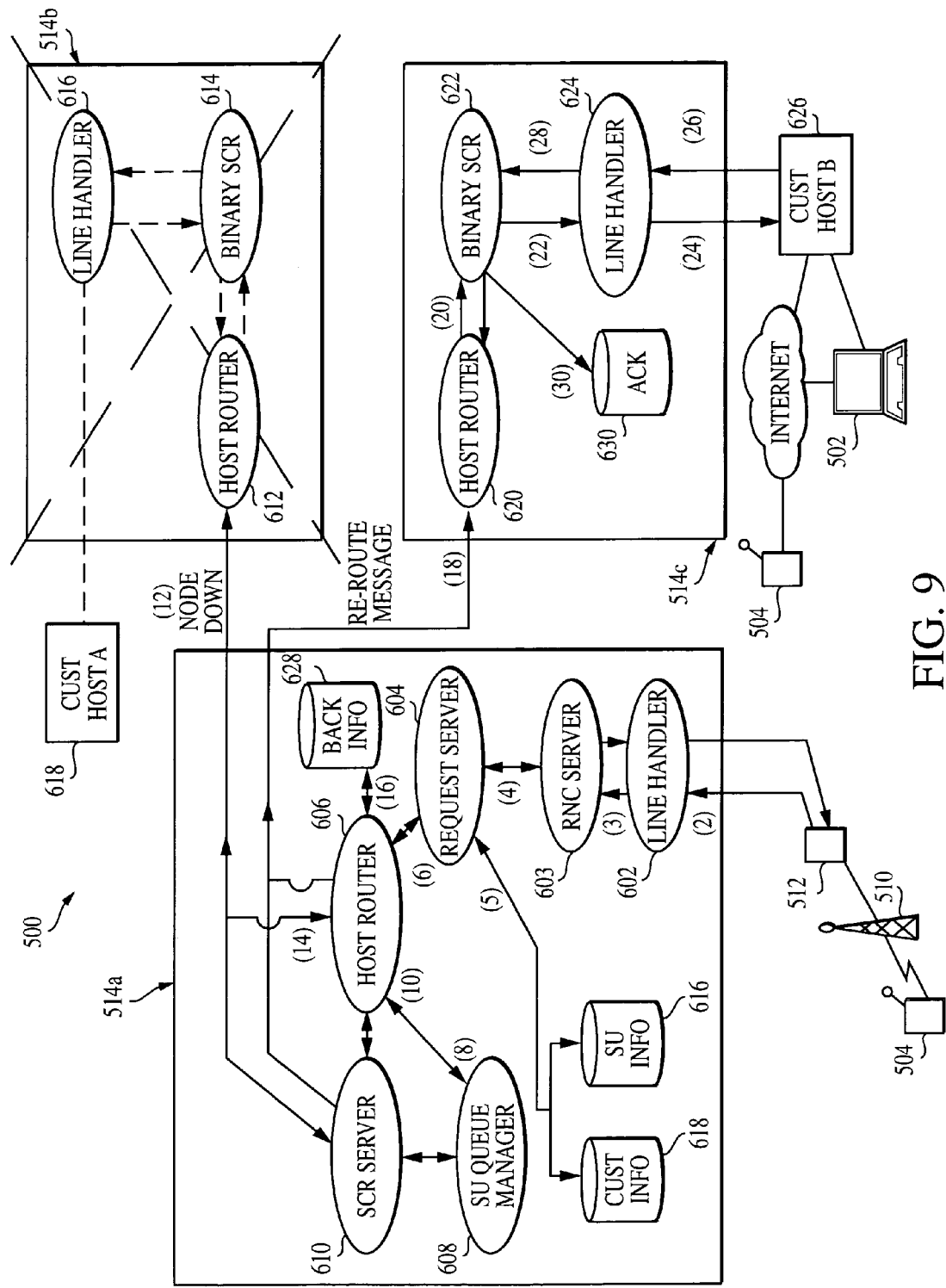
FIG. 9 is an exemplary block diagram of a redundant node configuration, which also illustrates a method in accordance with the present invention.

FIG. 9 provides backup routing in a case where the node (e.g., ACE 514b) associated with the intended receiving host computer e.g., host 618) is down or otherwise unresponsive. More specifically, a SU 502, 504, 506, via, for example, BTS 510 and RF/RNC 512, transmits (2) a message to line handler 602 within ACE 514a. The message, via line handler 602, is transmitted (3) to RNC server 603, which removes any RF transmission headers from the transmitted message. RNC server 603 then transmits (4) the message to request server 604, which reads (5) the SU 502, 504, 506 profile, and adds the primary network 500 information to the internal ACE 514 header. Such information can be stored, for example, in customer information database 616 and subscriber unit information database 618, as previously discussed.

The request server transmits (6) the data to the host router 606, which determines the location of the intended receiving host (e.g., host 618). Host router 606 optionally transmits (8) the message to SU queue manager 608 for message queuing. If SU queue manager is not used, the message can be transmitted directly to host router 612 or host router 620. When it is time for the message to be transmitted, the SU queue manager 608 transmits (10) the message back to the host router 606, which attempts to transmit (12) the message to host router 612 associated with ACE 514b.

Upon determining (14) that the message cannot be delivered to the host 618, the host router 606 reads (16) alternate routing information from database 628 as previously discussed. Host router 606 then transmits (18) the message to host router 620 associated with ACE 514c. Host router 620 transmits (20) the message to SCR server 622, which adds a transmission header to the message to transmit (22) the message to line handler 624 which, in turn transmits (24) the message to a backup host (e.g., host 626) as determined by information stored in database 628. The message can optionally be subsequently transmitted to, for example, a computing device 502 directly from the host 626 or via the Internet 650, and/or to a SU 504 via the Internet 650. Line handlers 624, 616 do not need to directly interface to hosts 626, 618, respectively. For example, line handlers 624 and/or 616 can optionally interface with the Internet or other intermediate network (not shown) before a message reaches a host 626, 618.

Upon receiving confirmation (26) that the message has been successfully transmitted to host 626, line handler 624 transmits (28) an acknowledgement to SCR server 622 which, in turn, transmits (30) the acknowledgement to server 630. In addition to the routing system and method described, one or more host computers (not shown) can optionally be similarly utilized in conjunction with ACE 514a.

Figure 10:
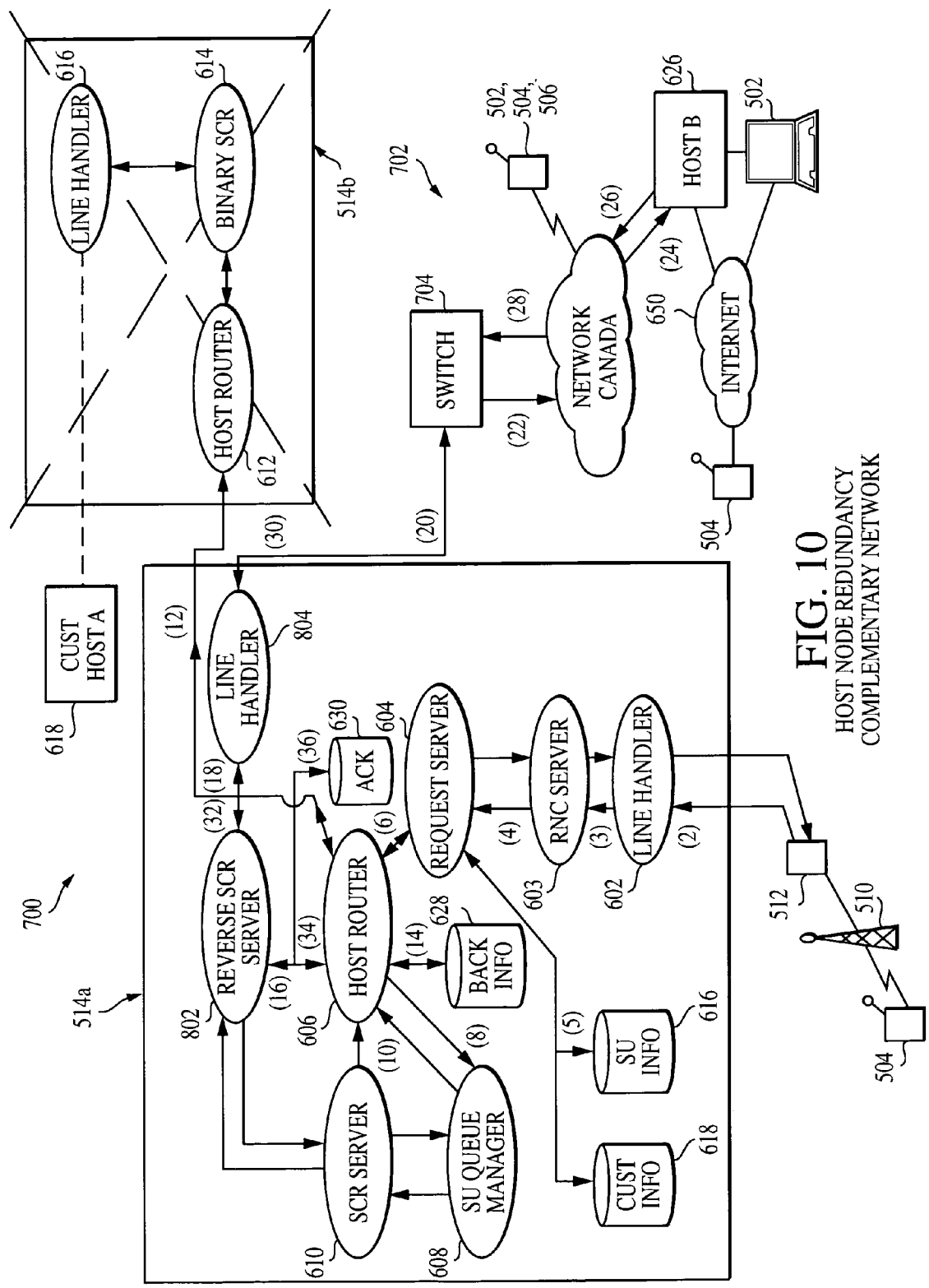
FIG. 10 is an exemplary block diagram of a redundant node configuration that can be used in conjunction with a primary network and a secondary network, which also illustrates a method in accordance with the present invention.

FIG. 10 provides an alternate embodiment of backup routing where no host computer is associated with the node (e.g., ACE 514a) at which the SU 502, 504, 506 originates the transmitted message, and the backup host to which the message is transmitted is associated with a complementary network (e.g., network 702). More specifically, a SU 502, 504, 506, via, for example, BTS 510 and RF/RNC 512, transmits (2) a message to line handler 602 within ACE 514a. The message, via line handler 602, is transmitted (3) to RNC server 603, which removes any RF transmission headers from the transmitted message. The RNC server 603 then transmits (4) the message to request server 604, which reads (5) the SU 502, 504, 506 profile, and adds the primary network 500 information to the internal ACE 514 header. In one embodiment, such information can be stored, for example, in databases 616 and 618, as previously described.

The request server transmits (6) the data to the host router 606, which determines the location of the intended receiving host (e.g., host 618). Host router 606 optionally transmits (8) the message to SU queue manager 608 for message queuing. If SU queue manager 608 is not utilized, the message can be transmitted directly to host router 612 or reverse SCR server 802. When it is time for the message to be transmitted, the SU queue manager 608 transmits (10) the message to the host router 606, which transmits (12) the message to host router 612 associated with ACE 514b.

Upon determining that the message cannot be delivered to ACE 514b, the host router 606 reads (14) alternate routing information from database 628, and transmits (16) the message to reverse SCR server 802, which adds appropriate headers to the message so that the network 500 looks like a customer host to the complementary network 702.

Specifically, the reverse SCR server 802 adds the appropriate IB SCR message header and transmits (18) the message to line handler 804 which, in turn, transmits the message to, for example, switch 704. Switch 704 preferably views the connection as it would a standard host connection, and transmits (22) the message to the network 702 as it would any other message to the designated SU 502, 504, 506 and/or host 626. The network 702, in turn, transmits (24) the message to the intended backup host (e.g., host 626). The message can optionally be subsequently transmitted to, for example, a computing device 502 directly from the host 626 or via the Internet 650, and/or to a SU 504 via the Internet 650. Computing device 502 and/or line handler 616 con interface to respective hosts 626, 618 via the Internet or other intermediate network.

Upon receiving confirmation (26) that the message has been successfully transmitted to host 626, the network 702 transmits (28) an acknowledgement to switch 704 which, in turn, transmits (30) the acknowledgement to line handler 804. Line handler 804 then transmits the message to reverse SCR server 802, which removes any transmission headers associated with network 702. The reverse SCR server 802 then transmits (34) the message to host router 606 for subsequent storage (32) in server 630.

In this embodiment, a SU 502, 504, 506 or host computer 632 in a complementary network 702 can also transmit to a SU in the primary network 500. In this case, the complementary network 702, in effect, becomes functionally equivalent to the primary network 500. As such, switch 704 (or equivalent thereof) may need to be physically and/or logically modified to provide functionality similar to, or substantially similar to, ACE 514a and/or ACE 514b. That is, when the primary network 500 transmits to a secondary network 702, no modification of the secondary network 702 is necessarily required since the primary network 700 appears as any other host would to the secondary network. However, when the secondary network 702 is transmitting to the primary network 500, and also wants to provide the features of the present invention to its associated or registered SUs or customers, the secondary network 702 may be required to have a functionality similar to ACEs 514a, 514b to enable SU 502, 504, 506 to transmit a message between the designated secondary network (e.g., 702) and one or more other networks (e.g., 500).

A SU 502, 504, 506 that roams between the primary network 700 and the secondary network 702 will preferably be registered using standard procedures and/or real-time via standard identification procedures with each respective network. The secondary network 702 could also be a satellite network such as the Bell Mobility network. Further, two or more complementary and/or communication networks 702 can be utilized in accordance with the present invention.

It should be further understood that the connection of the ACE 514a to switch 704 is perceived by the secondary network 702 as it would any other supported connection (e.g., X.25). That is, in accordance with one embodiment of the present invention, it is preferred that the ACE 514a appear as a host to a switch 704 (or equivalent thereof) of a complementary network 702.

Another embodiment of the present invention contemplates the use of a bridge connection between the primary 500 and secondary 702 networks, so that the interface that connects the respective primary network 500 and secondary network 702 to the bridge have the same address.

While the embodiment described in FIG. 10 has focused on one specific network configuration, other network configurations are possible and may be used with the present invention to implement the functionality and features described herein. For example, instead of using a host-based routing scheme as described above, the ACE 514a may also route from a first SU 502, 504, 506 to a receiving SU 502, 504, 506 in the complementary network 702, without using a host computer 618, 626, by using a conventional e-mail protocol such as the Post Office Protocol (e.g., POP3, POP4, etc.) or Simple Mail Transfer Protocol (SMTP). In this case, the Reverse SCR server 802 can utilize, for example, the POP3 and/or POP4 and/or SMTP protocol, rather than the SCR. In addition to the routing system and method described, one or more host computers (not shown) can optionally be similarly utilized in conjunction with ACE 514a. When routing is to a second SU 502, 504, 506 (not shown) in lieu of a host computer 618, 626, it is preferred that the SU queue manager 608 be utilized FIG. 11 is an exemplary block diagram of a redundant node configuration in accordance with the present invention that can utilize a round robin routing scheme, which also illustrates a method in accordance with the present invention.

Figure 11:
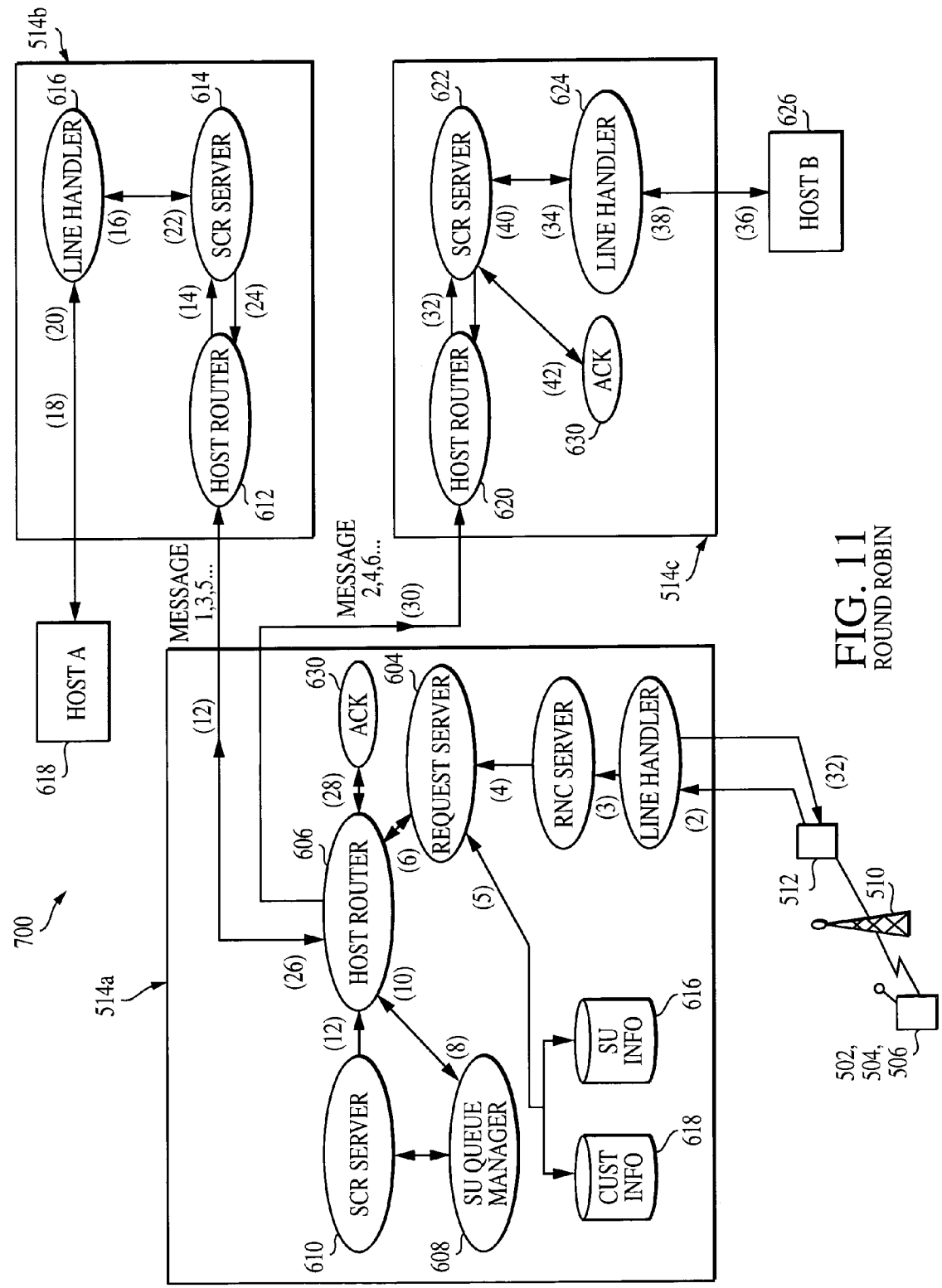
FIG. 11 is an exemplary block diagram of a redundant node configuration that can utilize a round robin routing scheme, which also illustrates a method in accordance with the present invention.

With regard to FIG. 11, items/steps 2–6 are performed essentially the same as described with regard to FIG. 6. Host router 606 then determines whether the most previous message transmitted by SU 502, 504, 506 was transmitted to ACE 514b or ACE 514c. Assuming the SU 502, 504, 506 transmitted the most recently transmitted message to host 626 via ACE 514c, the host router 606 would, in round robin fashion, designate the present message to be transmitted to host 618 via ACE 514b.

The host router 606 optionally transmits (8) the message to the SU queue manager 608, which queues the message. If SU queue manager is not utilized, the message can be transmitted directly to host router 612 or host router 620. When it is time for the message to be transmitted, the SU queue manager 608 transmits (10) the message to host router 606, which transmits (12) the message to host router 612 for subsequent transmission (14) to SCR server 614. SCR server 614 adds a transmission header and transmits (16) the message to the line handler 616 which, in turn, transmits (18) the message to host 618.

When the message has been delivered, host 618 transmits (20) an acknowledgement to line handler 616 which, in turn, transmits (22) the acknowledgement to SCR server 614. SCR server 614 then transmits (24) the acknowledgement to host router 612 which, in turn, transmits (26) the acknowledgement to host router 606. Host router 606 then transmits (28) the acknowledgement to server 630.

When a SU 562, 504, 506 transmits a subsequent message that can be transmitted to either host 618 or host 626, the message is transmitted to customer host 626 in accordance with, for example, a round-robin routing scheme. When the message reaches host router 606, the message is transmitted (8) to the SU queue manager 608, back (10) to the host router 606, and to (30) host router 620.

Host router 620 then transmits (32) the message to SCR server 622, which adds a transmission header to the message and transmits (34) the message to line handler 624. Line handler 624 subsequently transmits (36) the message to host 626. The message can optionally be subsequently transmitted to a computing device 502 directly from the host 626 or via the Internet 650, and/or to a SU 504 via the Internet 650. Computing device 502 does not need to directly interface to host 626. For example, computing device 502 can optionally interface with the Internet or other intermediate network (not shown) before a message reaches host 626.

Upon receiving confirmation (38) that the message has been successfully transmitted to host 626, line handler 634 transmits (40) an acknowledgement to SCR server 622 which, in turn, transmits the acknowledgement (42) to server 630. In addition to the routing system and method described, one or more host computers (not shown) can optionally be similarly utilized in conjunction with ACE 514a. Line handlers 624, 616 can optionally interface to respective hosts 626, 618 via the Internet or other intermediate network (not shown).

In another embodiment, when a given customer or organization has a host computer on two or more nodes (e.g., 514b and 514c), the network 500 can randomly assign a given SU 502, 504, 506 to a certain host computer (e.g., 618a) based upon, for example, an SU identification number. For example, for a given SU 502, 504, 506 identification number, the network 500 can apply a conventional hash algorithm to the SU 502, 504, 506 identification number such that for a sufficient sample size of SUs 502, 504, 506, the SUs will be substantially evenly distributed and assigned to a given host computer. In the event that the assigned host computer is down, SU 502, 504, 506 messages can be transmitted to an alternate host computer.

As discussed with regard to FIG. 6, the message can optionally be subsequently transmitted to a computing device (not shown) 502 from the host 626 or via the Internet (not shown), and/or to a SU 504 (not shown) via the Internet 650 (not shown). Similarly, the message can optionally be subsequently transmitted to a computing device (not shown) 502 from the host 618 or via the Internet (not shown), and/or to a SU 504 (not shown) via the Internet 650 (not shown).

Figure 12:
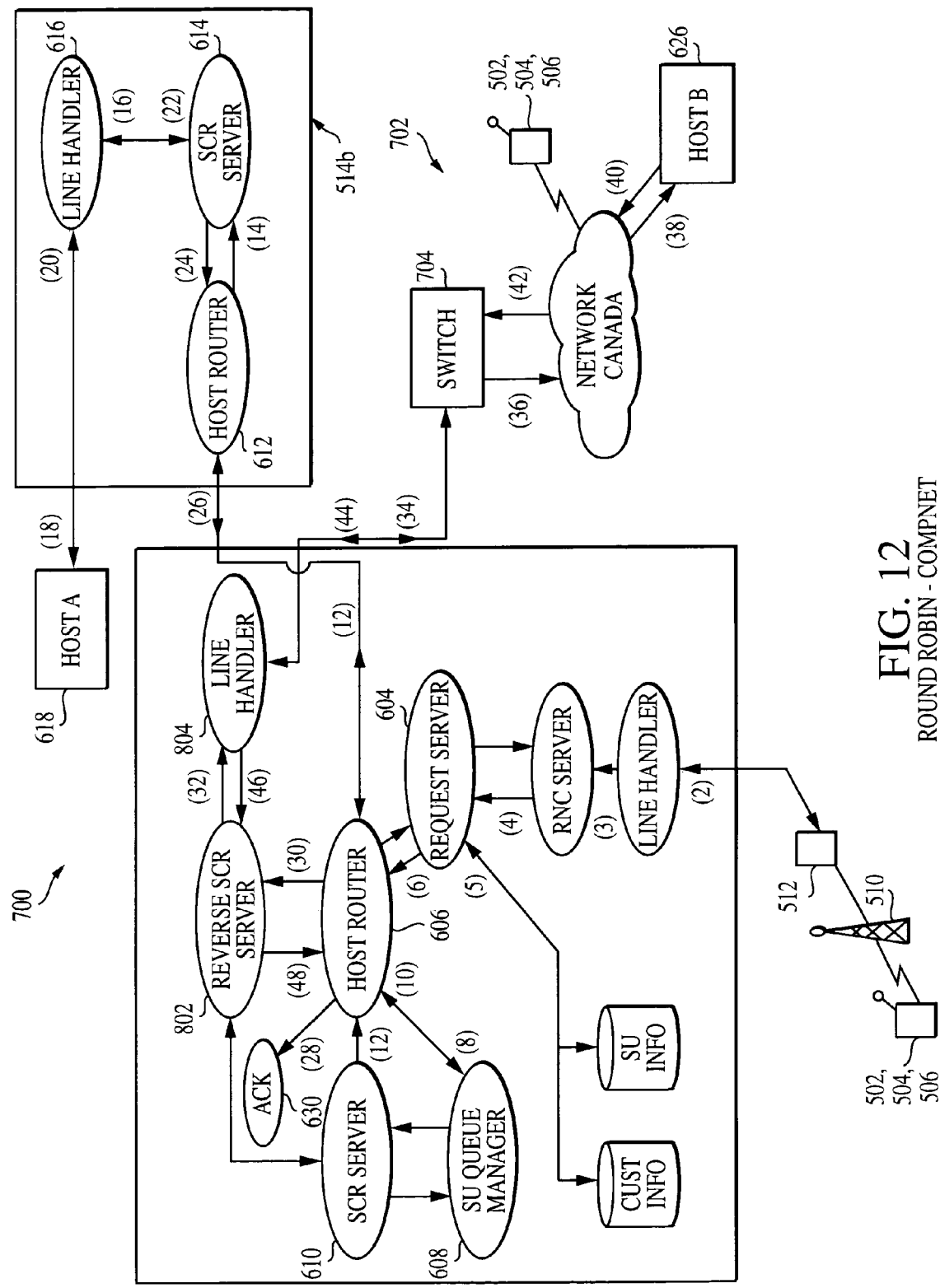
FIG. 12 is an exemplary block diagram of a redundant node configuration that can utilize a round robin routing scheme in connection with a primary network and a secondary network, which also illustrates a method in accordance with the present invention.

With regard to FIG. 12, items/steps 2–28 are performed essentially the same as described with regard to FIG. 11. When a SU 502, 504, 506 capable of transmitting to both hosts 618, 626 transmits a subsequent message, the message is transmitted to customer host 626 in complementary network 702 in accordance with a round-robin routing scheme or other routing scheme/algorithm. When the subsequent message is transmitted (6) to host router 606, the message is transmitted (8) to the SU queue manager 608, and back to host router 606, as previously described with regard to the first transmitted message. When a first SU 502, 504, 506 transmits to a second SU 502, 504, 506, it is preferred that the SU queue manager 608 be utilized.

Host router then transmits (30) the message to reverse SCR server 802, which adds appropriate headers to the message so that the network 500 looks like a customer host to the complementary network 702. Specifically, the reverse SCR server 802 adds the appropriate IB SCR message header and forwards (32) the message to line handler 804, which transmits (34) the message to, for example, switch 704. Switch 704 preferably views the connection as it would a standard host connection, and routes (36) the message to the network 702 as it would any other message to the designated SU 502, 504, 506 and/or host 626. The network 702 transmits (38) the messages to the intended round-robin host (e.g., host 626).

As discussed with regard to FIG. 11, the message can optionally be subsequently transmitted to a computing device (not shown) 502 from host 626 or via the Internet (not shown), and/or to a SU 504 (not shown) via the Internet 650 (not shown). Similarly, the message can optionally be subsequently transmitted to a computing device (not shown) 502 from the host 618 or via the Internet (not shown), and/or to a SU 504 (not shown) via the Internet 650 (not shown). Line handler 616 can connect to host A 618 via the Internet (not shown) or other intermediate network.

Upon receiving confirmation (40) that the message has been successfully transmitted to host 626, the network 702 transmits (42) an acknowledgement to switch 704 which, in turn, transmits (44) the acknowledgement to line handler 804. Line handler 804 then transmits (46) the acknowledgement to reverse SCR server 802 which, in turn, transmits (48) the acknowledgement to host router 606. Host router 606 then transmits (28) the acknowledgement to server 630.

Another embodiment of the present invention contemplates the use of a bridge connection between the primary 700 and secondary 702 networks, so that the interface that connects the respective primary network 500 and secondary network 702 to the bridge have the same address.

While the embodiment described in FIG. 12 has focused one specific network configuration, other network configurations are possible and may be used with the present invention to implement the functionality and features described herein. For example, instead of using a host-based routing scheme as described above, the ACE 514a may also route from a first SU 502, 504, 506 to a receiving SU 502, 504, 506 in the complementary network 702, without using a host computer 618, 626, by using a conventional e-mail protocol such as the Post Office Protocol (e.g., POP3, POP4, etc.) or Simple Mail Transfer Protocol (SMTP). In this case, the Reverse SCR server 802 can utilize, for example, the POP3 and/or POP4 and/or SMTP protocol, rather than the SCR. In addition to the routing system and method described, one or more host computers (not shown) can optionally be similarly utilized in conjunction with ACE 514a.

Figure 13:
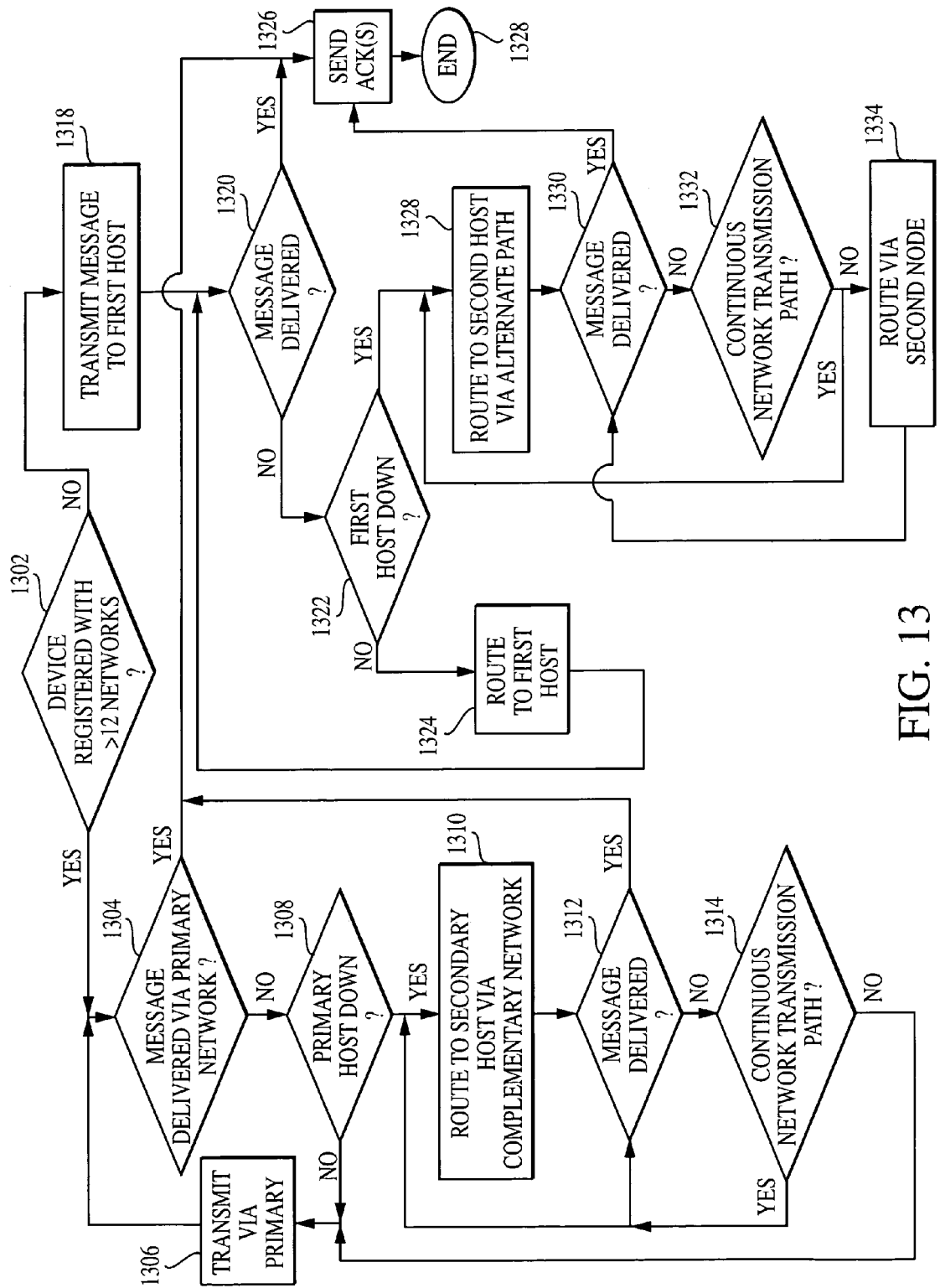
FIG. 13 shows an exemplary method of host routing.

FIG. 13 shows an exemplary method in accordance with the present invention. At decision step 1302, a determination is made whether the device is registered to transmit to two or more networks. If so, at decision step 1304 a determination is made whether the message has been delivered by the primary network. If the message has been delivered by the primary network, the host computer (e.g., host 618) transmits an acknowledgement to the primary network 500, and the process terminates at step 1328. If the message has not yet been delivered by the primary network 500, a determination is made at decision step 1308 whether the intended host in the primary network 500 or a host (e.g., host 618)

associated therewith is down. If the intended host in the primary network 500 is not down, the message is transmitted to the intended host (e.g., host 618) at step 1306.

If at decision step 1308 it is determined that the intended host (e.g., host 618) in the primary network 500 is down, the message is routed to a second (backup) host (e.g., host 626) within a complementary network at step 1310. At decision step 1312, a determination is made whether the message has been delivered to the backup host (e.g., host 626) in the complementary network 702. If the message has been delivered, an acknowledgment is sent from the backup host (e.g., host 626) to the primary network 500 via the complementary network 702, and the process ends at step 1328.

If it is determined at decision step 1312 that the message has not been delivered, then at decision step 1314 a determination is made whether the transmission path is continuous, available or active. If there is continuity in the transmission path, the process repeats beginning at step 1310. If the transmission path within the secondary network is not continuous (e.g., a node or transmission line is down), then another attempt is made to transmit the message at step 1306.

If at decision step 1302 it is determined that the device (e.g., SU 502, 504, 506) is registered with only a single network (e.g., network 500), then at step 1318 the message is transmitted to a first host within that network. At decision step 1320, a determination is made whether the message has been delivered. If the message has not been delivered, a determination is made at decision step 1322 whether the first host is down. If the first host is not down, the message is again transmitted to the first host at step 1324, and the process returns to decision step 1320.

If a determination is made at decision step 1322 that the first host is down, the message is transmitted to a second host within the primary network via an alternate path. At decision step 1330, a determination is made whether the message has been delivered. If the message has not been delivered, a determination is made at decision step 1322 whether there is a continuous network transmission path. If at decision step 1332 it is determined that there is continuity in the transmission path, an attempt to retransmit the message is made at step 1328.

If at decision step 1332 a decision is made that there is not continuity in the network transmission path or the transmission path is otherwise unacceptable (e.g., a host, node or transmission line is down or faulty), then the message is transmitted to the designated host via a second node (e.g., ACE 514b) within the primary network, and the process returns to decision step 1330. An acknowledgement message is transmitted at step 1330 from the receiving host to the primary network upon verification of receipt of the transmitted message at decision step 1330. The process then terminates at step 1328.

Figure 14:
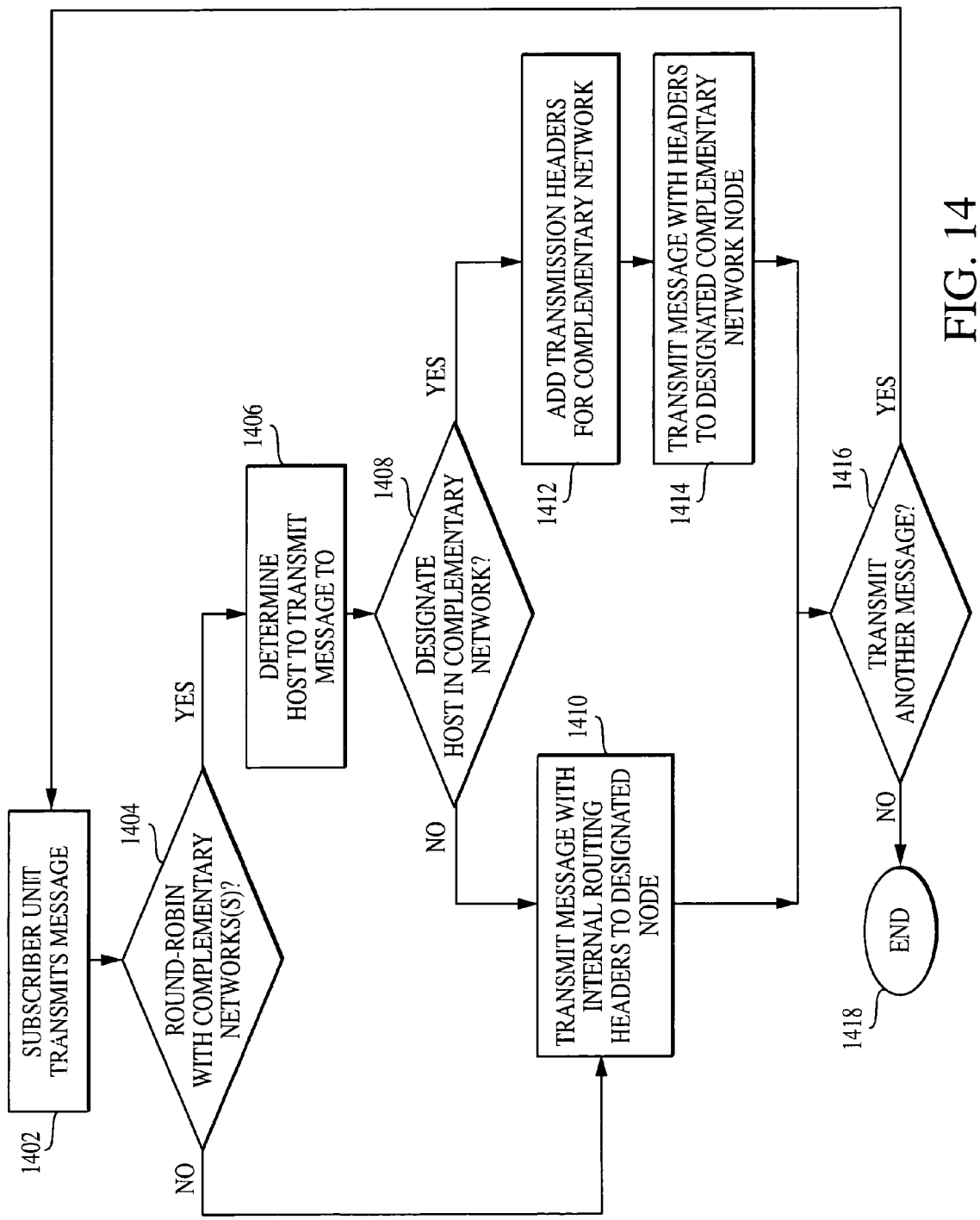
FIG. 14 shows an exemplary method of round-robin message routing.

FIG. 14 shows an exemplary method of round-robin message routing in accordance with the present invention. Other routing techniques may optionally be used. At step 1402 a subscriber unit (e.g., SU 502, 504, 506) transmits a message. At decision step 1404, a determination is made whether the round robin routing scheme is used with a primary and/or a complementary network. If a complementary network is utilized, a determination is made at step 1406 as to which host (e.g., host 618, host 626) the message is to be transmitted to. Such a determination can be based upon, for example, traversing a circular queue, with each routing node representing an element within the queue.

At decision step 1408, a determination is made whether the designated routing switch is within the complementary network. If so, transmission headers are added at step 1412 to the message by, for example, an appropriate protocol server (e.g., reverse SCR server 802). At step 1414, the message is transmitted with a header associated with the complementary network. At decision step 1416, a determination is made whether another message is queued for transmission. If so, the process returns to step 1402; if not the process terminates at step 1418.

If at decision step 1404 it is determined that a complementary network is not used, or if at decision step 1408 it is determined that a complementary network is not used, then at step 1410 the message is transmitted to a designated host (e.g., host 618) within the primary network (e.g., network 500), after which decision step 1416 is executed, as previously discussed.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. While the foregoing invention has been described in detail by way of illustration and example of preferred embodiments, numerous modifications, substitutions, and alterations are possible without departing from the scope of the invention defined in the following claims.

Having thus described our invention, what we claim as new and desire to secure by Letters Patent is as follows:

1. A wireless communication system enabling a device to transmit data via first and second routing switches to a second host computer associated with at least the second routing switch, subsequent to determining that a first host computer associated with the first and second routing switches cannot receive the data, said system comprising:

a first routing switch, associated with the first host computer, receiving data from the device and, said first routing switch comprising:
   a first server for at least one of adding and deleting a radio frequency header respectively to and from the data;
   a second server, communicable with said first server, for reading a routing configuration of the device;
   a host router, communicable with said second server, for adding a routing header to the data;
   a protocol server communicable with at least said host router for adding a protocol header to the data compatible with the first host computer to which the data is transmitted;
a second routing switch communicable with at least said first routing switch and the second host computer; and
said first routing switch receiving the data from the device, reading by said second server a routing configuration of the device comprising routing data pertaining to the first host computer and the second host computer to which the device transmits data, adding a first routing header to the data for transmitting at least the data to the first host computer and, upon determining that said first host computer is unresponsive, transmitting at least the data to the second routing switch,
said second routing switch adding a second routing header to the data for transmitting at least the data to the first host computer and, upon determining that the first host computer is unresponsive, adding a third routing header and transmitting at least the data to said second host computer.

2. The system according to claim 1, wherein the device is a wireless device.

3. The system according to claim 1, wherein the device is a non-wireless device.

4. The system according to claim 1, further comprising at least one queue manager, communicable with said host router, for determining a time to transmit the data to at least one of the second host computer and the second routing switch.

5. A wireless communication system enabling a device to transmit data via first and second routing switches to a first host computer, communicable with said first wireless network, subsequent to determining that a second host computer via a third routing switch cannot receive the data, said system comprising:
  a first routing switch receiving data the device comprising:
    a first server for at least one of adding and deleting a radio frequency header respectively to and from the data;
    a second server, communicable with said first server, for reading a routing configuration of the device;
    a host router, communicable with said second server, for adding a routing header to the data;
  a second routing switch communicable with at least said first routing switch and associated with the first host computer;
  a third routing switch communicable with said first routing switch and said second routing switch, wherein said third routing switch is associated with a second host computer;
  said first routing switch receiving the data from the device, said second server reading a routing configuration of the device comprising routing data pertaining to at least one of the first host computer and the second host computer to which the device transmits data, said host router adding a first routing header to the data for transmitting at least the data to the second host computer via said third routing switch and;
  said third routing switch, upon determining that said second host computer is unresponsive, adding a second routing header for transmitting at least the data to the first host computer via said second routing switch.

6. The system according to claim 5, wherein the first device is a wireless device.

7. The system according to claim 5, wherein the first device is a non-wireless device.

8. The system according to claim 5, further comprising a queue manager, communicable with said host router, for determining a time to transmit the data to at least one of the second host computer and the second routing switch.

9. A wireless communication system enabling a device associated with at least a first wireless network to transmit data via first and second routing switches to a first host computer in a complementary network, communicable with said first wireless network, subsequent to determining that a second host computer via a third routing switch associated with the first wireless network cannot receive the data, said system comprising:
  a first routing switch receiving data from the device, comprising;
    a first server for at least one of adding and deleting a radio frequency header respectively to and from the data;
    a second server, communicable with said first server, for reading a routing configuration of the device;
    a host router, communicable with said second server, for adding a routing header to the data;
    a first protocol server, communicable with at least said host router, for adding a protocol header to the data compatible with a host computer to which the data is transmitted within the first network;
    a second protocol server, communicable with said host router, for adding a protocol header to the data compatible with a host computer to which the data is transmitted within the complementary network;
  a second routing switch associated with the complementary network, communicable with at least said first routing switch and the first host computer;
  a third routing switch associated with the second host computer, communicable with said first routing switch and said second routing switch; and
  said second server reading a routing configuration of the device comprising routing data pertaining to at least one of the first host computer and the second host computer to which the device transmits data;
  said first protocol server adding a first routing header for transmission of the data to the second host computer via said third routing switch;
  said third routing switch receiving the data from said device via said first routing switch and, upon determining that said second host computer is unresponsive, adding a second routing header associated with said second routing switch for transmitting the data to the first host computer.

10. The system according to claim 9, wherein said third routing switch comprises a server for adding a radio frequency header to the data.

11. The system according to claim 9, wherein the device is a wireless device registered with at least the first wireless network.

12. The system according to claim 9, wherein the first device is a non-wireless device registered with at least the first wireless network.

13. The system according to claim 9, further comprising a queue manager, communicable with said host router, for determining a time to transmit the data to at least one of the second host computer and the second routing switch.

14. A wireless communication system enabling a device to transmit data via first and second routing switches to a first host computer, subsequent to determining that a third routing switch cannot receive the data, said system comprising:
  a first routing switch receiving data from the device, comprising:
    a first server for at least one of adding and deleting a radio frequency header respectively to and from the data;
    a second server, communicable with said first server, for reading a routing configuration of the device;
    a host router, communicable with said second server, for adding a routing header to the data;
    a queue manager, communicable with said host router, for determining a time to transmit the data to the third routing switch;
    a protocol server, communicable with said host router, for adding a protocol header to the data compatible with a host computer to which the data is transmitted;
  a second routing switch communicable with at least said first routing switch and a first host computer;
  a third routing switch, associated with a second host computer;
  said first routing switch receiving the data from the device;

said second server reading a routing configuration of the device comprising routing data pertaining to at least one of the first host computer and the second host computer to which the device transmits data;

said host router adding a first routing header for transmission of the data to the second host computer via said third routing switch; and said host router, upon determining that said third routing switch is unresponsive, adding a second routing header for transmitting the data to the first host computer via said second routing switch.

15. The system according to claim 14, wherein the device is a wireless device.

16. The system according to claim 14, wherein the device is a non-wireless device.

17. The system according to claim 14, further comprising a queue manager, communicable with said host router, for determining a time to transmit the data to at least one of the second host computer and the second routing switch.

18. A wireless communication system enabling a device within a first wireless network to transmit data via first and second routing switches to a first host computer in a complementary network, communicable with said first wireless network, subsequent to determining that a third routing switch associated with the first wireless network cannot receive the data, said system comprising:

a first routing switch receiving data from the device, comprising:
   a first server for at least one of adding and deleting a radio frequency header respectively to and from the data;
   a second server, communicable with said first server, for reading a routing configuration of the device;
   a host router, communicable with said second server, for adding a routing header to the data;
   a first protocol server, communicable with said host router, for adding a protocol header to the data compatible with a host computer to which the data is transmitted within the first network;
   a second protocol server, communicable with said host router, for adding a protocol header to the data compatible with a host computer to which the data is transmitted within the complementary network;
a second routing switch associated with the complementary network, communicable with at least said first routing switch and the first host computer;
said second server reading a routing configuration of the device comprising routing data pertaining to at least one of the first host computer and the second host computer to which the device transmits data;
said host router adding a first routing header for transmission of the data to the second host computer via said third routing switch; and
said second routing server, upon determining that said third routing switch is unresponsive, adding a second routing header associated with said second routing switch for transmitting the data to the first host computer in the complementary network.

19. The system according to claim 18, wherein said second routing switch comprises a server for adding a radio frequency header to the data.

20. The system according to claim 18, wherein the device is a wireless device registered with at least the first wireless network.

21. The system according to claim 18, wherein the device is a non-wireless device registered with at least the first wireless network.

22. The system according to claim 18, further comprising a queue manager, communicable with said host router, for determining a time to transmit the data to at least one of the second host computer and the second routing switch.

23. A wireless communication system enabling a device to transmit data alternately between at least a first host computer, connected to a second routing switch, using first and second routing switches, and a second host computer, connected to a third routing switch, using first and third routing switches, said system comprising:

a first routing switch receiving data from the device, comprising:
   a first server for at least one of adding and deleting a radio frequency header respectively to and from the data;
   a second server, communicable with said first server, for reading a routing configuration of the device;
   a host router, communicable with said second server, for adding a routing header to the data;
   a protocol server, communicable with said host router, for adding a protocol header to the data compatible with a host computer to which the data is transmitted;
a second routing switch communicable with at least said first routing switch and the first host computer;
a third routing switch communicable with said first routing switch and the second host computer;
said first routing switch receiving the data from the device;
said host router determining whether a most recent preceding data transmission eligible for transmission to at least one of the first host computer and the second host computer was received by the first host computer or the second host computer, adding a routing header to the data for transmission of at least the data to the other of the first host computer and the second host computer, and transmitting at least the data to the other of the first host computer via said second routing switch and the second host computer via said third routing switch.

24. The system according to claim 23, wherein the device is a wireless device.

25. The system according to claim 23, wherein the device is a non-wireless device.

26. The system according to claim 23, further comprising a queue manager, communicable with said host router, for determining a time to transmit the data to at least one of the second host computer and the second routing switch.

27. A wireless communication system enabling a device to transmit data alternately between at least a first host computer, connected to a second routing switch, using first and second routing switches, and a second host computer, connected to a third routing switch, using first and third routing switches, said system comprising:

a first routing switch receiving data from the device, comprising:
   a first server for at least one of adding and deleting a radio frequency header respectively to and from the data;
   a second server, communicable with said first server, for reading a routing configuration of the device;
   a host router, communicable with said second server, for adding a routing header to the data;
   a protocol server, communicable with said host router, for adding a protocol header to the data compatible with a host computer to which the data is transmitted and assigning a primary host computer to which the device initially transmits;

a second routing switch communicable with at least said first routing switch and the first host computer;
a third routing switch communicable with said first routing switch and the second host computer;
said first routing switch receiving the data from the device;
said host router adding a routing header to the data for transmission of at least the data to the assigned host computer, and transmitting at least the data to the assigned host computer.

28. The system according to claim 27, further comprising a queue manager, communicable with said host router, for determining a time to transmit the assigned host computer.

29. A wireless communication system enabling a device to transmit data alternately between at least a first computer, connected to a second routing switch communicable with a first wireless network, using first and second routing switches, and a second computer, connected to a third routing switch communicable with a second wireless network, using first and third routing switches, said system comprising:
a first routing switch, communicable with the first wireless network, receiving data from the device via the first wireless network, comprising:
a first server preparing the data to be routed;
a second server, communicable with said first server, reading a routing configuration of the device;
a router, communicable with said second server, configuring the data with routing information;
a first protocol server, communicable with said router, for adding first protocol information to the data at least compatible with the first computer within the first wireless network to which the data is transmitted;
a second protocol server, communicable with said router, for adding second protocol information to the data at least compatible with the second computer within the second wireless network to which the data is transmitted;
a second routing switch communicable with the first wireless network and communicable with at least said first routing switch and the first computer;
a third routing switch communicable with the second wireless network and communicable with said first routing switch and the second computer;
said first routing switch receiving data from the device, determining whether a most recent preceding data transmission capable of transmission to at least one of the first computer and the second computer was received by the first computer or the second computer, and adding a first routing header to the data for transmission of at least the data to the other of said first computer and said second computer.

30. The system according to claim 29, wherein the device is a wireless device registered with at least the second wireless network.

31. The system according to claim 29, wherein the device is a non-wireless device registered with at least the second wireless network.

32. The system according to claim 29, further comprising a queue manager, communicable with said router, for determining a time to transmit the data to at least the second computer.

33. A method enabling a device utilizing a wireless communication system to transmit data via first and second routing switches to a second computer communicable with at least the second routing switch, subsequent to determining that a first computer associated with the first and second routing switches cannot receive the data, said method comprising the steps of:
receiving data, via a first routing switch, from the device;
determining host routing preferences of the device;
adding protocol information to the data compatible with at least the first computer to where the data is first transmitted;
upon determining that the data cannot be transmitted to the first computer, transmitting at least the data to the second routing switch;
adding at the second routing switch second routing information to the data;
transmitting by the second routing switch at least the data to the first computer using the second routing information; and
upon determining that the data cannot be transmitted to the first computer, adding by the second routing switch third routing information to the data; and
transmitting by the second routing switch at least the data to the second computer using the third routing information.

34. A method enabling a device utilizing a wireless communication system to transmit data to a computer via a second routing switch, subsequent to determining that the data cannot be transmitted to the computer via the first routing switch, said method comprising the steps of:
receiving data, via a first routing switch, from the device;
determining host routing preferences of the device;
adding protocol information to the data compatible with the computer;
upon determining that the computer cannot receive the data, transmitting at least the data to the second routing switch;
adding at the second routing switch second routing information to the data; and
transmitting by the second routing switch at least the data to the computer using the second routing information.

35. A method enabling a device to transmit data via first and second routing switches to a first host computer, communicable with the first wireless network, subsequent to determining that a second host computer via a third routing switch cannot receive the data, said method comprising the steps of:
receiving data via a first routing switch from the device;
adding radio frequency information to the data;
reading a routing configuration of the device;
adding routing information associated with the second host computer to the data;
adding protocol information to the data compatible with at least the second host computer to where the data is transmitted; and
upon determining that the second host computer is unresponsive, adding at the first routing switch second routing information for transmitting at least the data to the first host computer via the second routing switch.

36. A method enabling a device associated with at least a first wireless network to transmit data via first and second routing switches to a first host computer in a complementary network, communicable with the first wireless network, subsequent to determining that a second host computer via a third routing switch associated with the first wireless network cannot receive the data, said method comprising the steps of:
receiving data at a first routing switch from the device;
adding radio frequency information to the data;
reading a routing configuration of the device;
adding routing information to the data;

transmitting the data to the second host computer via said third routing switch; and upon determining that the second host computer has not received the data, adding by the third routing switch protocol information associated with the second routing switch to facilitate transmission of at least the data to the first host computer.

37. A method enabling a device to transmit data via first and second routing switches to a first host computer, subsequent to determining that a third routing switch cannot receive the data, said method comprising the steps of:

receiving data, at a first routing switch, from the device;
deleting radio frequency information from the data;
reading a routing configuration of the device;
adding routing information to the data;
adding protocol information to the data compatible with at least a host computer communicable with the third routing switch;
transmitting at least the data to the third routing switch; and
upon determining that the third routing switch cannot receive the data, adding by the first routing switch second routing information for transmitting at least the data to the first host computer via the second routing switch.

38. A method enabling a device within a first wireless network to transmit data via first and second routing switches to a first host computer in a complementary network, communicable with the first wireless network, subsequent to determining that a third routing switch associated with the first wireless network cannot receive the data, said method comprising the steps of:

receiving at the first routing switch data from the device;
adding protocol information to the data compatible with at least the second host computer, associated with the third routing switch, to where the data is initially transmitted; and
upon determining that the third routing switch is unresponsive, adding by the first routing switch second routing information associated with the second routing switch for transmitting at least the data to the first host computer communicable with the complementary network.

39. A method enabling a device to transmit data alternately between at least a first host computer, communicable with a second routing switch, using first and second routing switches, and a second host computer, communicable with a third routing switch, using first and third routing switches, said method comprising the steps of:

receiving at the first routing switch data from the device;
adding radio frequency information to the data;
reading a routing configuration of the device;
adding protocol information to the data compatible with at least a host computer to where the data is transmitted;
determining whether a most recent preceding data transmission eligible for transmission to at least one of the first host computer and the second host computer was received by the first host computer or the second host computer; and
adding routing information to the data for transmission of at least the data to the other of the preceding first host computer and the second host computer; and
transmitting at least the data to the other of the preceding first host computer via the second routing switch and the second host computer via the third routing switch.

40. A method enabling a device to transmit data alternately between at least a first host computer, communicable with a second routing switch associated with a first wireless network, using first and second routing switches, and a second host computer, communicable with a third routing switch associated with a second wireless network, using first and third routing switches, said method comprising the steps of:

transmitting data, to the first routing switch, from the device;
receiving data, at the first routing switch, via the device;
determining whether a most recent preceding data transmission capable of transmission to at least one of the first wireless network and the second wireless network was transmitted to the first wireless network or the second wireless network;
adding routing information, corresponding to at least one of the first wireless network and the second wireless network, to the data for transmission of at least the data to the other of the preceding first wireless network and the second wireless network; and
transmitting at least the data to the other of the preceding first host computer via the second routing switch and the second host computer via the third routing switch.

41. A wireless communication system enabling a device to transmit data via first and second routing switches to a host computer associated with at least the first and second routing switches, subsequent to determining that the host computer cannot receive the data from the first routing switch, said system comprising:

a first routing switch, associated with the host computer, receiving data from the device, said first routing switch comprising:
  a first server for at least one of adding and deleting radio frequency information respectively to and from the data;
  a second server, communicable with said first server, for reading a routing configuration of the device;
  a host router, communicable with said second server, for adding routing information to the data;
  a protocol server communicable with at least said host router for adding protocol information to the data compatible with at least the host computer to where the data is transmitted; and
a second routing switch communicable with at least said first routing switch and the host computer,
said first routing switch receiving the data from the device, reading by said second server a profile of the device comprising routing data pertaining to the host computer, adding first routing information to the data for transmitting at least the data to the host computer, and upon determining that the host computer cannot receive the data from said first routing switch, transmitting at least the data to said second routing switch for subsequent transmission of at least the data to the host computer.

42. A system enabling a device utilizing a wireless communication system to transmit data via a second routing switch to a computer, subsequent to determining that a first routing switch cannot transmit the data to the computer, said system comprising:

means for receiving data, via a first routing switch, from the device;
means for determining host routing preferences of the device;
means for adding routing information to the data;
means for adding protocol information to the data compatible with at least the computer to where the data is transmitted;

means for transmitting at least the data to the second routing switch upon determining that the computer has not received the data;
means for adding at the second routing switch second routing information to the data; and means for transmitting by the second routing switch at least the data to the computer using the second routing information.

* * * * *

UNITED STATES PATENT AND TRADEMARK OFFICE
CERTIFICATE OF CORRECTION

| | |
|---|---|
| PATENT NO. | : 7,230,944 B1 |
| APPLICATION NO. | : 10/440367 |
| DATED | : June 12, 2007 |
| INVENTOR(S) | : Massie et al. |

It is certified that error appears in the above-identified patent and that said Letters Patent is hereby corrected as shown below:

Column 12, line 33, "comprise" should read -- comprises --

Column 25, line 45, "con" should read -- can --

Column 27, line 14, "562" should read -- 502 --

Signed and Sealed this

Thirteenth Day of November, 2012

David J. Kappos
*Director of the United States Patent and Trademark Office*